US012775530B2

(12) United States Patent
May et al.

(10) Patent No.: US 12,775,530 B2
(45) Date of Patent: Oct. 27, 2026

(54) INTELLIGENT REDUNDANCY MANAGEMENT FRAMEWORK FOR A RECONFIGURABLE DATA PROCESSOR

(71) Applicant: SambaNova Systems, Inc., Palo Alto, CA (US)

(72) Inventors: Kyle May, Palo Alto, CA (US); Arnav Goel, San Jose, CA (US); Qi Zheng, Fremont, CA (US); Pushkar Shridhar Nandkar, Hayward, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

(21) Appl. No.: 19/005,204

(22) Filed: Dec. 30, 2024

(65) Prior Publication Data

US 2025/0217240 A1 Jul. 3, 2025

Related U.S. Application Data

(60) Provisional application No. 63/616,952, filed on Jan. 2, 2024.

(51) Int. Cl.
*G06F 11/16* (2006.01)
*G06F 11/20* (2006.01)

(52) U.S. Cl.
CPC ...... *G06F 11/1658* (2013.01); *G06F 11/2069* (2013.01)

(58) Field of Classification Search
CPC ......................... G06F 11/1658; G06F 11/2069
See application file for complete search history.

(56) References Cited

U.S. PATENT DOCUMENTS

| | | | |
|---|---|---|---|
| 10,698,853 B1 | 6/2020 | Grohoski et al. | |
| 10,831,507 B2 | 11/2020 | Shah et al. | |
| 10,949,328 B2 * | 3/2021 | Evans | G06F 8/31 |
| 11,327,771 B1 * | 5/2022 | Grohoski | G11C 29/4401 |
| 11,386,038 B2 | 7/2022 | Prabhakar et al. | |
| 2021/0373867 A1 | 12/2021 | Chen et al. | |
| 2022/0012077 A1 | 1/2022 | Kumar et al. | |

* cited by examiner

*Primary Examiner* — Ashish Thomas
*Assistant Examiner* — Kayo Lisa Rusin
(74) *Attorney, Agent, or Firm* — FP; Rutawari Sharma; Sikander M. Khan

(57) ABSTRACT

A data processing system comprises a coarse-grained reconfigurable (CGR) processor including an array of reconfigurable units which are configured to execute a dataflow graph. The system further includes a compiler coupled to provide a configuration file including a configuration for a set of components in a plurality of components in the array of reconfigurable units. The configuration file is coupled to configure the set of components using the configuration. An intelligent redundancy management framework (IRMF) checks health of the configuration and identify the configuration as defective if a component in the set of component is defective. further performs a healing operation for the defective configuration by replacing the defective configuration with an alternate configuration using a different set of all healthy components.

19 Claims, 26 Drawing Sheets

700, 710

User Program Statements

```
Linear = torch.nn.linear(K,N)
Relu – torch.nn.relu
Softmax = torch.nn.Softmax(dim=3)
X1 = torch.randn(N, C, M, K)
X2 =%1.to("RDP")
X3 = Linear(X2)
X4 = Relu(X3)
X5 = Softmax(X4)
X6 = X5.to("CPU")
```

750

User Program Computation Graph

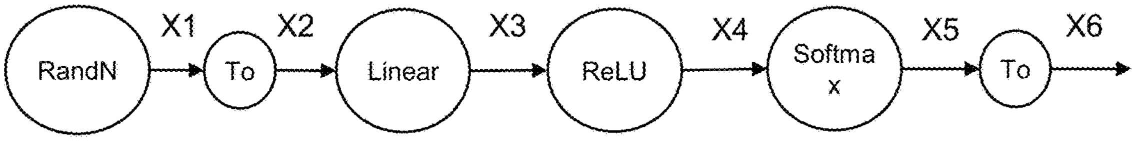

FIG. 7

800, 810

| Air/Tensor Statements | Tensor Size | |
|---|---|---|
| %1 = air.Input(name: "In0"): | NxCxMxK bf16 | |
| %2 = air.Linear(%1): | NxCxMxN bf16 | |
| %3 = air.ReLU(%2): | NxCxMxN bf16 | |
| %4 = air.Exp(%3): | NxCxMxN bf16 | Softmax Lowering |
| %5 = air.Sum(%4, dim: 3): | NxCxMx1 bf16 | |
| %6 = air.Div(%4, %5): | NxCxMxN bf16 | |
| %7 = air.Output(%6) | | |

850

Air/Tensor Computation Graph

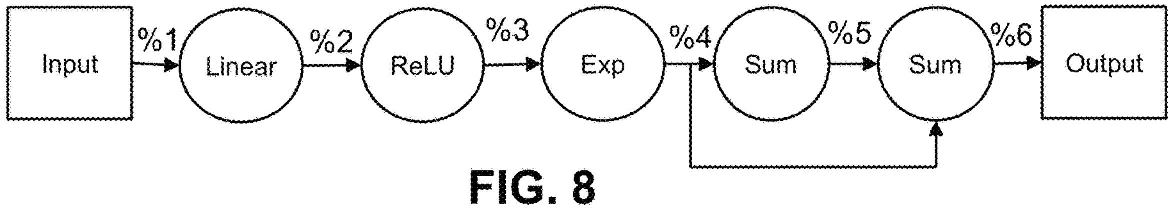

FIG. 8

900

| Template Dataflow Statements | Tensor Size |
|---|---|
| %1 = tlir.Region(name: "In0"): | NxCxMxK bf16 |
| %2 = tlir.Region(name: "Weight"): | KxN bf16 |
| %3 = tlir.Region(name: "Bias"): | 1xN bf16 |
| %4 = tlir.Region(name: "Out0"): | NxCxMxN bf16 |
| %5 = tlir.Load(%2) | |
| %6 = tlir.Load(%3) | |
| %7 = tlir.MetaPipeline(iters: N) { | |
| %8 = tlir.Load(%1, dim: 1): | CxMxK bf16 |
| %9 = tlir.Buffer(%5, depth: 2): | CxMxK bf16 |
| %10 = tlir.MetaPipeline(iters: C) { | |
| %11 = tlir.ReadSlice(%9, dim: 1): | MxK bf16 |
| %12 = tlir.Linear(%5, %11): | MxN bf16 |
| %13 = tlir.Buffer(%12, depth: 2): | MxN bf16 |
| %14 = tlir.AddBias(%13, %6): | MxN bf16 |
| %15 = air.ReLU(%14): | MxN bf16 |
| %16 = air.Exp(%15): | MxN bf16 |
| %17 = tlir.Buffer(%16, depth: 2): | MxN bf16 |
| %18 = tlir.Sum(%17, dim: 1): | Mx1 bf16 |
| %19 = tlir.Div(%17, %18): | MxN bf16 |
| %20 = tlir.Store(%4, %19) | |
| } | |
| } | |

910 920

950

Unstitched Template Computation Graph

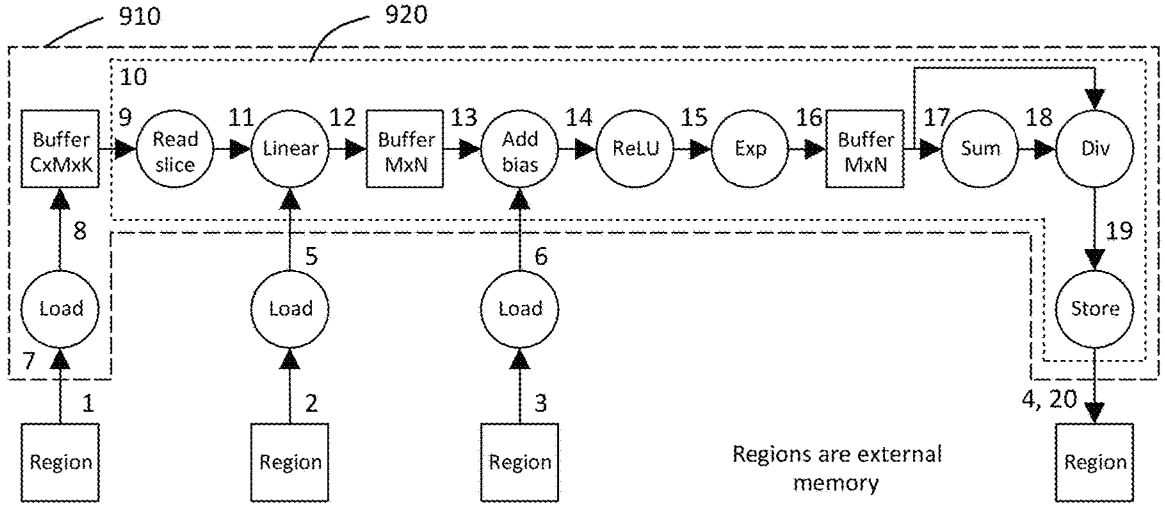

FIG. 9

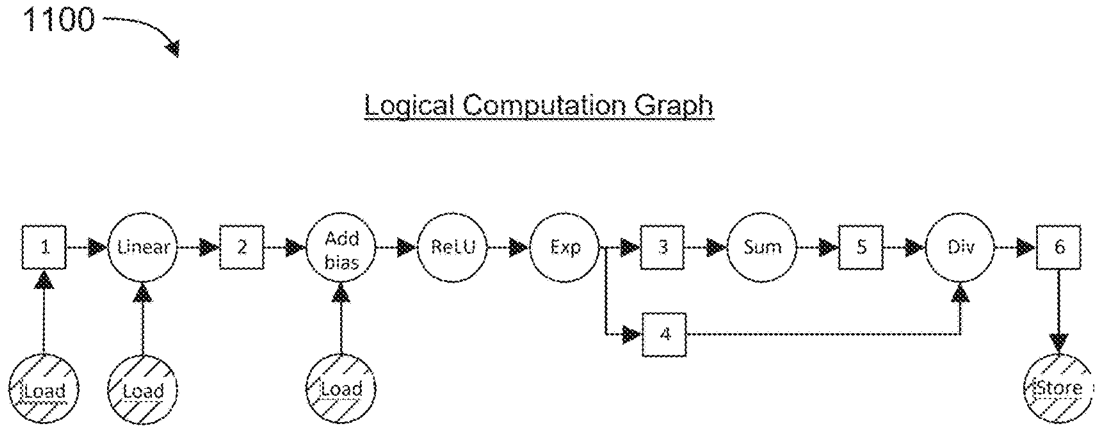
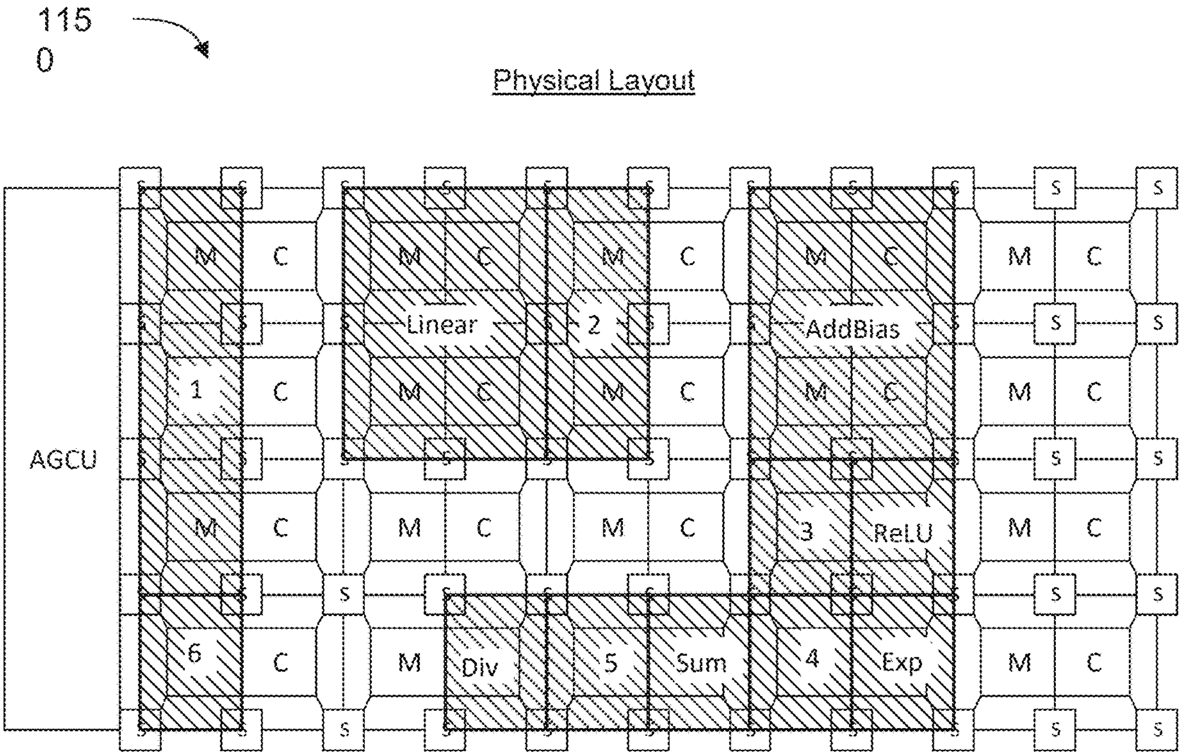
FIG. 11

INTELLIGENT REDUNDANCY MANAGEMENT FRAMEWORK FOR A RECONFIGURABLE DATA PROCESSOR

CROSS REFERENCE TO RELATED APPLICATIONS

This application claims the benefit of U.S. Patent Application No. 63/616,952, entitled, "Intelligent Redundancy Management Framework For A Reconfigurable Data Processor," filed on Jan. 2, 2024. The provisional application is hereby incorporated by reference for all purposes.

RELATED APPLICATION(S) AND DOCUMENTS

This application is related to the following papers and commonly owned applications:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;

U.S. Nonprovisional patent application Ser. No. 16/239,252, filed Jan. 3, 2019, now U.S. Pat. No. 10,698,853, entitled "VIRTUALIZATION OF A RECONFIGURABLE DATA PROCESSOR;"

U.S. Nonprovisional patent application Ser. No. 16/197,826, filed Nov. 21, 2018, now U.S. Pat. No. 10,831,507, entitled "CONFIGURATION LOAD OF A RECONFIGURABLE DATA PROCESSOR;"

U.S. Nonprovisional patent application Ser. No. 16/407,675, filed May 9, 2019, now U.S. Pat. No. 11,386,038, entitled "CONTROL FLOW BARRIER AND RECONFIGURABLE DATA PROCESSOR;"

U.S. Nonprovisional patent application Ser. No. 16/890,841, filed Jun. 2, 2020, entitled "ANTI-CONGESTION FLOW CONTROL FOR RECONFIGURABLE PROCESSORS;"

U.S. Nonprovisional patent application Ser. No. 16/922,975, filed Jul. 7, 2020, entitled "RUNTIME VIRTUALIZATION OF RECONFIGURABLE DATA FLOW RESOURCES;"

U.S. Provisional Patent Application No. 63/236,218, filed Aug. 23, 2021, entitled "SWITCH FOR A RECONFIGURABLE DATAFLOW PROCESSOR."

All of the related application(s) and documents listed above are hereby incorporated by reference herein for all purposes.

TECHNICAL FIELD

The present subject matter relates to an intelligent redundancy management framework (IRMF) to self-heal configurable data units in a reconfigurable data processor.

BACKGROUND

The technology disclosed relates to an intelligent redundancy management framework (IRMF) to self-heal configurable data units in a reconfigurable data processor.

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Systems with reconfigurable processors which execute dataflow graphs include a compiler which translates and synthesizes a machine learning model of the dataflow graphs onto arrays of reconfigurable units. For performing various operations related to the dataflow graphs, software needs to program a pool of healthy components. Efficient management of healing of defective components is required for increasing overall performance of such systems.

BRIEF DESCRIPTION OF THE DRAWINGS

The technology will be described with reference to the drawings, in which:

FIG. 7 shows an example implementation of an example user program in a first stage of a compiler stack.

FIG. 8 shows an example implementation of the example user program in a second stage of a compiler stack.

FIG. 9 shows an example implementation of the example user program in a third stage of a compiler stack.

FIG. 11 shows the logical computation graph and an example physical layout of the example user program.

DETAILED DESCRIPTION

Figure 1:
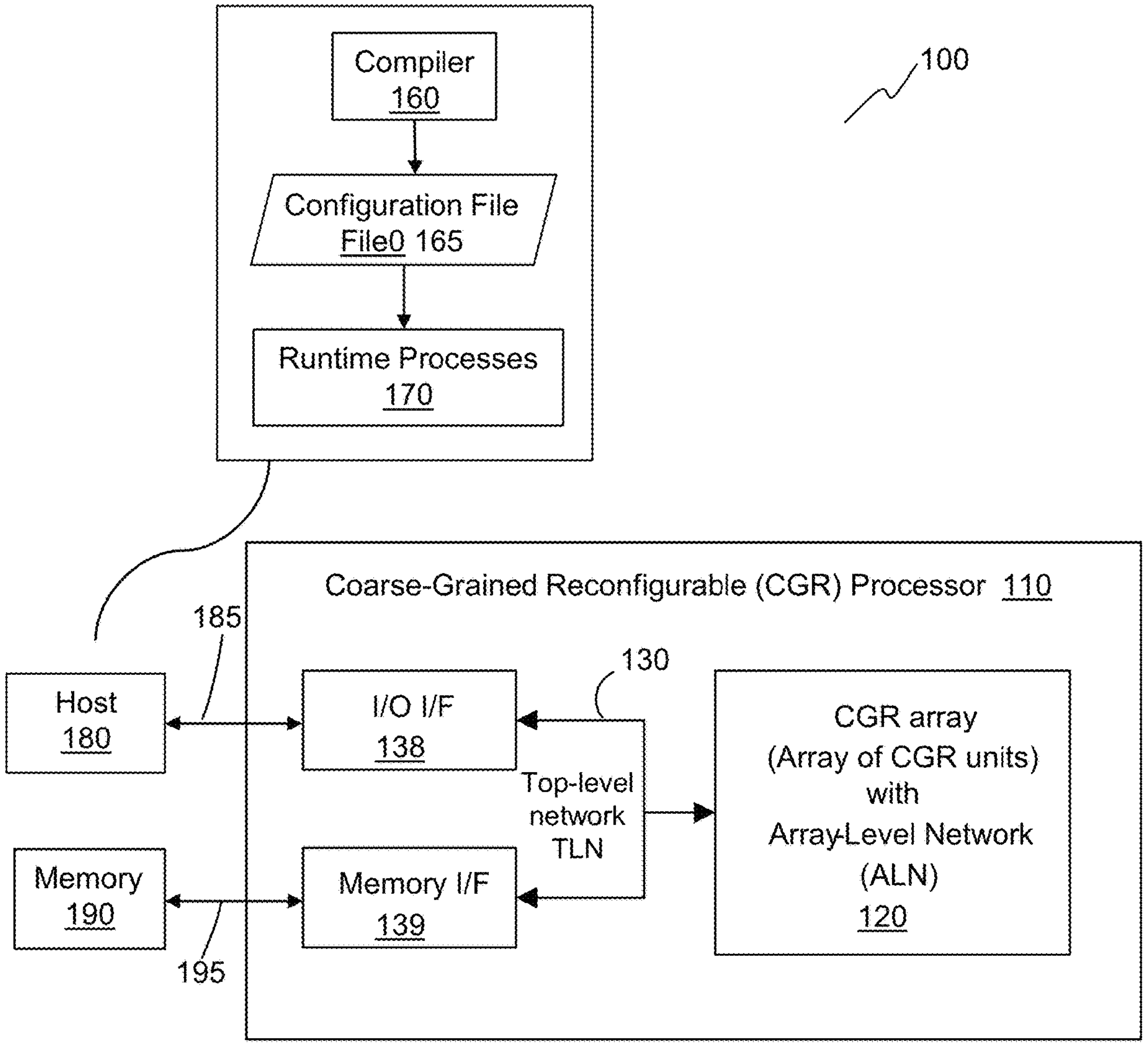
FIG. 1 is a system diagram illustrating a system including a host, a memory, and a coarse-grained reconfigurable (CGR) processor.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures and components have been described at a relatively high level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity. The technology disclosed relates to self-healing of a coarse-grained reconfigurable (CGR) processor using healthy components or in other words self-healing of operations to be performed by the runtime wants in a CGR processor.

More specifically, embodiments of the present disclosure describe an intelligent redundancy management redundancy framework (IRMF) which can self-heal any operations that have defective configurable units. In other words. the IRMF also heals any configuration file as a mechanism to avoid any defective configurable units in the CGR processor. A CGR processor includes arrays of reconfigurable units arranged as "tiles." Each tile may also be referred to as a "minimum compute/computing unit." In order to execute a data graph, a CGR processor has to perform a range of graph-related operations (e.g., running a graph, tuning the hyper-parameters of a graph, updating input/output endpoints of a graph, etc.)

The IRMF is a system to efficiently manage operations (such as configure, translate, observe, etc.) with components that have been marked as defective. In order to complete the operations, software needs to directly or indirectly program a pool of components of a minimum compute unit of a CGR. Some components may be healthy while some may be defective as a result of the inaccuracies in the manufacturing process. In order for the operations to run correctly, any defective component must be "healed." A CGR can typically include a plurality of tiles, each including an array of configurable units. The IRMF manages each tile's defective components.

In one example of the disclosed system can include a control plane (also known as a control layer) coupled to initialize the IRMF and a data plane (also known as a data layer) coupled to interact with the IRMF in order to perform the graph-related operations. To optimize performance, the IRMF can either perform healing dynamically or statically. The IRMF is made aware of defective components for each tile.

As will be explained later in the specification, a tile as shown in FIGS. 3 to 5A includes various components such as pattern compute units (PCUs) pattern memory units (PMUs) AGCUs, switches, and more. During manufacturing processes any of these components can turn out to be defective. Such defective components may be present in the default configuration file. The CGR processor may be considered unhealthy if used in a default configuration file. According to an example, the CGR processor is healed by changing/modifying the configuration file to use a different component (healthy) to execute the same program.

In one example, the control layer can be initialized with the defective component information or can dynamically detect defective components at runtime. For example, a manufacturing process could mark specific tile components as defective, and then, during system initialization, the IRMF may initialize itself with information about those components being defective.

In one example, the IRMF can dynamically inspect or identify the defective components. In some cases, the components may not be fully defective but affected by a defect to some degree.

For any graph-related operation, a plurality of components are configured to perform various computational tasks. In other words, various configurations are generated for a plurality of components for various computational tasks. In one example, these components include PCUs, PMUs, AGCUs, and switches. In other examples, there can be other reconfigurable units, In one example, there can be rows of such components and for each row a configuration is generated which is related to a specific computational task. In the beginning, it may be understood that the compiler generates various default configurations related to the computational tasks. The compiler also receives component health data from the manufacturer. Based on the health data, if any component (for example, PCU) in a particular row is defective (or affected by a defect) then the entire row of components is considered defective or in other words the configuration is considered defective and as such discarded. Furthermore, a new (healthy) configuration is generated using a new row with all the healthy components, in other words, the defective configuration is healed using healthy components.

In static healing, an alternate/healthy configuration for each row is preemptively generated by the compiler. For example, if there are n rows of components in the CGR, then assuming that at least one component could be defective in each row, "n" alternate/healthy configurations are generated preemptively by the compiler. As such the configuration file generated by the compiler includes both default configurations and the alternate configurations. In some examples, the compiler may first generate a default configuration file and then update that with alternate configurations to generate a final (updated) configuration file.

The configuration file including both the default configurations and the alternate configurations is then provided to the IRMF. The IRMF compares default configurations with the component health data. If any component is defective (or affected by a defect) then it replaces the default configuration comprising that component with an alternate configuration. As such, the IRMF replaces defective configurations with alternate configurations which are already present in the configuration file.

In dynamic healing, alternate configurations are generated by the IRMF itself. In this case, the configuration file generated by the compiler includes only the default configurations.

The configuration file including only the default configurations is then provided to the IRMF. The IRMF compares default configurations with the component health data. If any component is defective (or affected by a defect) then it generates on its own an alternate configuration using healthy components. As such, the IRMF replaces defective configurations with alternate configurations, i.e., heals the defective configuration. In some cases, during dynamic healing, the IRMF can receive each individual configuration at a time from the compiler and checks if its defective or not by comparing it with the component data. If the configuration is defective, then it heals the configuration by generating an alternate configuration for it. For example, upon receiving a configuration for a row of components, if a component (PCU/PMU/AGCU/switch) is affected by a defect, then the IRMF discards that row of components and generates a new configuration using another row comprising of healthy components.

In such a case, the IRMF can update the configuration using healing information whenever the data plane wants to perform a configuration operation. These configurations are generated statically (i.e., by the compiler) and used at runtime. For example, when running a program on a tile, the bitfile needs to be healed so the program only uses healthy tile components. Configuration operations are used during application-specific operations as well as in the control plane to enable certain runtime operations (for example, PMU initialization on system initialization). In one example, the IRMF which heals any configuration file as a mechanism to avoid any defective configurable units in the CGR processor.

Additionally, in one example, the data plane can perform observability operations, which allows a user to inspect the state of components of a specific tile. During observability operations, the runtime may generate a set of target components to inspect which may include defective components, and the IRMF can then heal the set of target components in the configuration file, to ensure that only healthy components are used for any operation. For example, if a user wants to inspect performance counters on a tile. The observability operation will try to target all the components on the tile. The IRMF can then heal the set of target components to make sure that performance counters of only healthy components are read.

An operation can be healed statically (compiler-generated) or dynamically (runtime-generated). Certain operations naturally map to either static or dynamic healing, so the entire system uses a hybrid approach. For example, some observability operations naturally map to a dynamic healing approach. For example, the user can specify a specific target component to inspect, and the IRMF heals that target component. Configuration operations can also be mapped via static or dynamic healing.

As can be appreciated by those skilled in the art, there is a space-time trade-off between static and dynamic healing. Space means the size of the configuration file. As the size of the configuration file increases, it can affect disk performance. As explained earlier, in a static healing scheme, the configurations are generated statically, meaning all possible healing options are generated preemptively in the same configuration file. Therefore, in static healing, size of the configuration file is O(n), where "O" is an operation (also referred to as configuration or healing option) and "n" is the number of defective component variations. In a dynamic healing scheme, a required healing option is be generated when a configuration is about to be used. Therefore, in dynamic healing, the space or the size of the configuration is O(1). As such, dynamic healing may take up less space than static healing.

Time is the runtime overhead to perform a configuration/observability operation. In static healing, a healing option is preemptively generated and stored in the program configuration file for each possible defective component configuration (i.e., each unique set of components that can be marked defective). Therefore, static healing may require less time compared to the dynamic healing, which is done during runtime.

In one example, performance optimization can be achieved in dynamic healing. This is due to the fact that each possible configuration generated in dynamic healing can have different performance characteristics in terms of space or time. As such, by generating different configurations, the dynamic healing can optimize the performance characteristics of configuration operations.

As can be understood, in static healing, the time complexity is O(1) and the space complexity is O(n), where n is the number of defective component configurations. When n is small, the space overhead is negligible and may not negatively impact on performance much. Additionally, other practical methods (i.e., compression) can be used to reduce the space scaling factor. However, as n increases, the additional space requirements may affect performance because of latency or bandwidth requirements, which are mentioned in the configuration file.

In dynamic healing, space complexity of dynamic healing is O(1), since all heal options are generated dynamically. The time complexity of dynamic healing is O(f(n)), where f represents the time complexity of the healing function invoked at runtime and n is the number of defective component configurations. The complexity of the function is dependent on the implementation and may vary depending on the scheme used. For example, a simple healing function might be O(n), whereas a healing function which performs more optimization might be O(n^2). In summary, dynamic and static healing make a tradeoff between space and time, and a hybrid approach allows for fine-grained tuning of performance. The IRMF can be made aware of different performance metrics, which can be used to optimize operation performance. While performing dynamic healing, the IRMF is solving an optimization problem, which is defined either by the user or by the compiler. For example, suppose that the IRMF is made aware of both the latency and bandwidth of memory. The compiler could specify that a given operation will be bottlenecked by memory bandwidth. When applying the dynamic healing function, the IRMF can optimize the healing for increased memory bandwidth, which would optimize the performance of the application. In another example, the IRMF could be made aware of the time complexity of different dynamic healing schemes. The compiler or user could specify that the runtime setup of the application is a performance bottleneck. The dynamic healing function could use a scheme which has a time complexity of O(n) rather than O(n^2) in order to optimize application performance, at the cost of a sub-optimal healing option with respect to memory bandwidth being used. Extending this, the IRMF can be made aware of any performance metric, both on the host and RDU, in order to optimize the performance of an operation.

Traditional compilers translate human-readable computer source code into machine code that can be executed on a Von Neumann computer architecture. In this architecture, a processor serially executes instructions in one or more threads of software code. The architecture is static, and the compiler does not determine how execution of the instructions is pipelined, or which processor or memory takes care of which thread. Thread execution is asynchronous, and safe exchange of data between parallel threads is not supported.

High-level programs for machine learning (ML) and artificial intelligence (AI) may require massively parallel computations, where many parallel and interdependent threads (meta-pipelines) exchange data. Such programs are ill-suited for execution on Von Neumann computers. They require architectures that are optimized for parallel processing, such as coarse-grained reconfigurable architectures (CGRAs) or graphic processing units (GPUs). The ascent of ML, AI, and massively parallel architectures places new requirements on compilers, including how computation graphs, and in particular dataflow graphs, are pipelined, which operations are assigned to which compute units, how data is routed between various compute units and memory, and how synchronization is controlled particularly when a dataflow graph includes one or more nested loops, whose execution time varies dependent on the data being processed.

As used herein, the phrase one should be interpreted to mean exactly one of the listed items. For example, the phrase "one of A, B, and C" should be interpreted to mean any of: only A, only B, or only C.

As used herein, the phrases at least one of and one or more of should be interpreted to mean one or more items. For example, the phrase "at least one of A, B, and C" or the phrase "at least one of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object merely refers to different instances or classes of the object and does not imply any ranking or sequence.

The following terms or acronyms used herein are defined at least in part as follows:

AGCU—address generator (AG) and coalescing unit (CU).

AI—artificial intelligence.

AIR—arithmetic or algebraic intermediate representation.

ALN—array-level network.

Buffer—an intermediate storage of data.

CGR—coarse-grained reconfigurable. A property of, for example, a system, a processor, an architecture (see CGRA), an array, or a unit in an array. This property distinguishes the system, etc., from field-programmable gate arrays (FPGAs), which can implement digital circuits at the gate level and are therefore fine-grained configurable. This term may be used alternatively with "RDU (reconfigurable dataflow unit.)"

CGRA—coarse-grained reconfigurable architecture. A data processor architecture that includes one or more arrays (CGR arrays) of CGR units.

Compiler—a translator that processes statements written in a programming language to machine language instructions for a computer processor. A compiler may include multiple stages to operate in multiple steps. Each stage may create or update an intermediate representation (IR) of the translated statements. Compiler stages are illustrated with reference to FIG. 5.

Computation graph—some algorithms can be represented as computation graphs. As used herein, computation graphs are a type of directed graphs comprising nodes that represent mathematical operations/expressions and edges that indicate dependencies between the operations/expressions. For example, with machine learning (ML) algorithms, input layer nodes assign variables, output layer nodes represent algorithm outcomes, and hidden layer nodes perform operations on the variables. Edges represent data (e.g., scalars, vectors, tensors) flowing between operations. In addition to dependencies, the computation graph reveals which operations and/or expressions can be executed concurrently.

CGR unit—a circuit that can be configured and reconfigured to locally store data (e.g., a memory unit or a PMU), or to execute a programmable function (e.g., a compute unit or a PCU). A CGR unit includes hardwired functionality that performs a limited number of functions used in computation graphs and dataflow graphs. Further examples of CGR units include a CU and an AG, which may be combined in an AGCU. Some implementations include CGR switches, whereas other implementations may include regular switches.

CU—coalescing unit.

Data Flow Graph—a computation graph that includes one or more loops that may be nested, and wherein nodes can send messages to nodes in earlier layers to control the dataflow between the layers.

Datapath—a collection of functional units that perform data processing operations. The functional units may include memory, multiplexers, ALUs, SIMDs, multipliers, registers, buses, etc.

FCMU—fused compute and memory unit—a circuit that includes both a memory unit and a compute unit.

Graph—a collection of nodes connected by edges. Nodes may represent various kinds of items or operations, dependent on the type of graph. Edges may represent relationships, directions, dependencies, etc.

IC—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in industry, produced by the same supply chains, and for the average user often indistinguishable from monolithic circuits.

A logical CGR array or logical CGR unit—a CGR array or a CGR unit that is physically realizable, but that may not have been assigned to a physical CGR array or to a physical CGR unit on an IC.

ML—machine learning.

PCU—pattern compute unit—a compute unit that can be configured to perform one or more operations.

PEF—processor-executable format—a file format suitable for configuring a configurable data processor.

Pipeline—a staggered flow of operations through a chain of pipeline stages. The operations may be executed in parallel and in a time-sliced fashion. Pipelining increases overall instruction throughput. CGR processors may include pipelines at different levels. For example, a compute unit may include a pipeline at the gate level to enable correct timing of gate-level operations in a synchronous logic implementation of the compute unit, and a meta-pipeline at the graph execution level to enable correct timing of node-level operations of the configured graph. Gate-level pipelines are usually hard wired and unchangeable, whereas meta-pipelines are configured at the CGR processor, CGR array level, and/or CGR unit level.

Pipeline Stages—a pipeline is divided into stages that are coupled with one another to form a pipe topology.

PMU—pattern memory unit—a memory unit that can locally store data.

PNR—place and route—the assignment of logical CGR units and associated processing/operations to physical CGR units in an array, and the configuration of communication paths between the physical CGR units.

RAIL—reconfigurable dataflow unit (RDU) abstract intermediate language.

CGR Array—an array of CGR units, coupled with each other through an array-level network (ALN), and coupled with external elements via a top-level network (TLN). A CGR array can physically implement the nodes and edges of a dataflow graph and is sometimes referred to as a reconfigurable dataflow unit (RDU).

SIMD—single-instruction multiple-data—an arithmetic logic unit (ALU) that simultaneously performs a single programmable operation on multiple data elements delivering multiple output results.

TLIR—template library intermediate representation.

TLN—top-level network.

IRMF—Intelligent Management Redundancy Framework

Initial configuration or default configuration—Configuration data in configuration file at the starting state.

The architecture, configurability and dataflow capabilities of an array of CGR units enable increased compute power that supports both parallel and pipelined computation. A CGR processor, which includes one or more CGR arrays (arrays of CGR units), can be programmed to simultaneously execute multiple independent and interdependent dataflow graphs. To enable simultaneous execution, the dataflow graphs may need to be distilled from a high-level program and translated to a configuration file for the CGR processor. A high-level program is source code written in programming languages like Spatial, Python, C++, and C, and may use computation libraries for scientific computing, ML, AI, and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

Translation of high-level programs to executable bitfiles/configuration files is performed by a compiler, see, for example, FIGS. 6 to 11. While traditional compilers sequentially map operations to processor instructions, typically without regard to pipeline utilization and duration (a task usually handled by the hardware), an array of CGR units requires mapping operations to processor instructions in both space (for parallelism) and time (for synchronization of interdependent computation graphs or dataflow graphs). This requirement implies that a compiler for a CGRA must decide which operation of a computation graph or dataflow graph is assigned to which of the CGR units, and how both data and, related to the support of dataflow graphs, control information flows among CGR units, and to and from external hosts and storage. This process, known as "place and route", is one of many new challenges posed to compilers for arrays of CGR units.

In dataflow processors with reconfigurable architectures, a pipeline of computational stages can be formed in the array of reconfigurable units to execute dataflow graphs. The computational stages Since various computational stages can have various latencies, efficiently manage the pipeline, especially when it comes to providing the final output of the pipeline, can be challenging.

FIG. 1 illustrates an example system 100 including a CGR processor 110, a host 180, and a memory 190. CGR processor 110 has a coarse-grained reconfigurable architecture (CGRA) and includes an array of CGR units 120 such as a CGR array. CGR processor 110 further includes an IO interface 138, and a memory interface 139. The array of CGR units 120 is coupled with IO interface 138 and memory interface 139 via databus 130 which may be part of a top-level network (TLN). Host 180 communicates with IO interface 138 via system databus 185, and memory interface 139 communicates with memory 190 via memory bus 195. Array of CGR units 120 may further include compute units and memory units that are connected with an array-level network (ALN) to provide the circuitry for execution of a computation graph or a dataflow graph that may have been derived from a high-level program with user algorithms and functions. The high-level program may include a set of procedures, such as learning or inferencing in an AI or ML system. More specifically, the high-level program may include applications, graphs, application graphs, user applications, computation graphs, control flow graphs, dataflow graphs, models, deep learning applications, deep learning neural networks, programs, program images, jobs, tasks and/or any other procedures and functions that may need serial and/or parallel processing. In some implementations, execution of the graph(s) may involve using multiple units of CGR processor 110. In some implementations, CGR processor 110 may include one or more ICs. In other implementations, a single IC may span multiple CGR processors. In further implementations, CGR processor 110 may include one or more units of array of CGR units 120.

Host 180 may be or include a computer such as further described with reference to FIG. 2. Host 180 runs runtime 170, as further referenced herein, and may also be used to run computer programs, such as the compiler 160, further described herein with reference to FIG. 6. In some implementations, the compiler may run on a computer that is similar to the computer described with reference to FIG. 2 but separate from host 180.

CGR processor 110 may accomplish computational tasks by executing a configuration file file0 165. For the purposes of this description, a configuration file corresponds to a dataflow graph, or a translation of a dataflow graph, and may further include initialization data. A compiler 160 compiles the high-level program to provide the configuration file file0

165. In some implementations described herein, a CGR array is configured by programming one or more configuration stores with all or parts of the configuration file file0 165. A single configuration store may be at the level of the CGR processor or the CGR array, or a CGR unit may include an individual configuration store. The configuration file may include configuration data for the CGR array and CGR units in the CGR array and link the computation graph to the CGR array. Execution of the configuration file file0 165 by CGR processor 110 causes the CGR array(s) to implement the user algorithms and functions in the dataflow graph.

CGR processor 110 can be implemented on a single integrated circuit die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
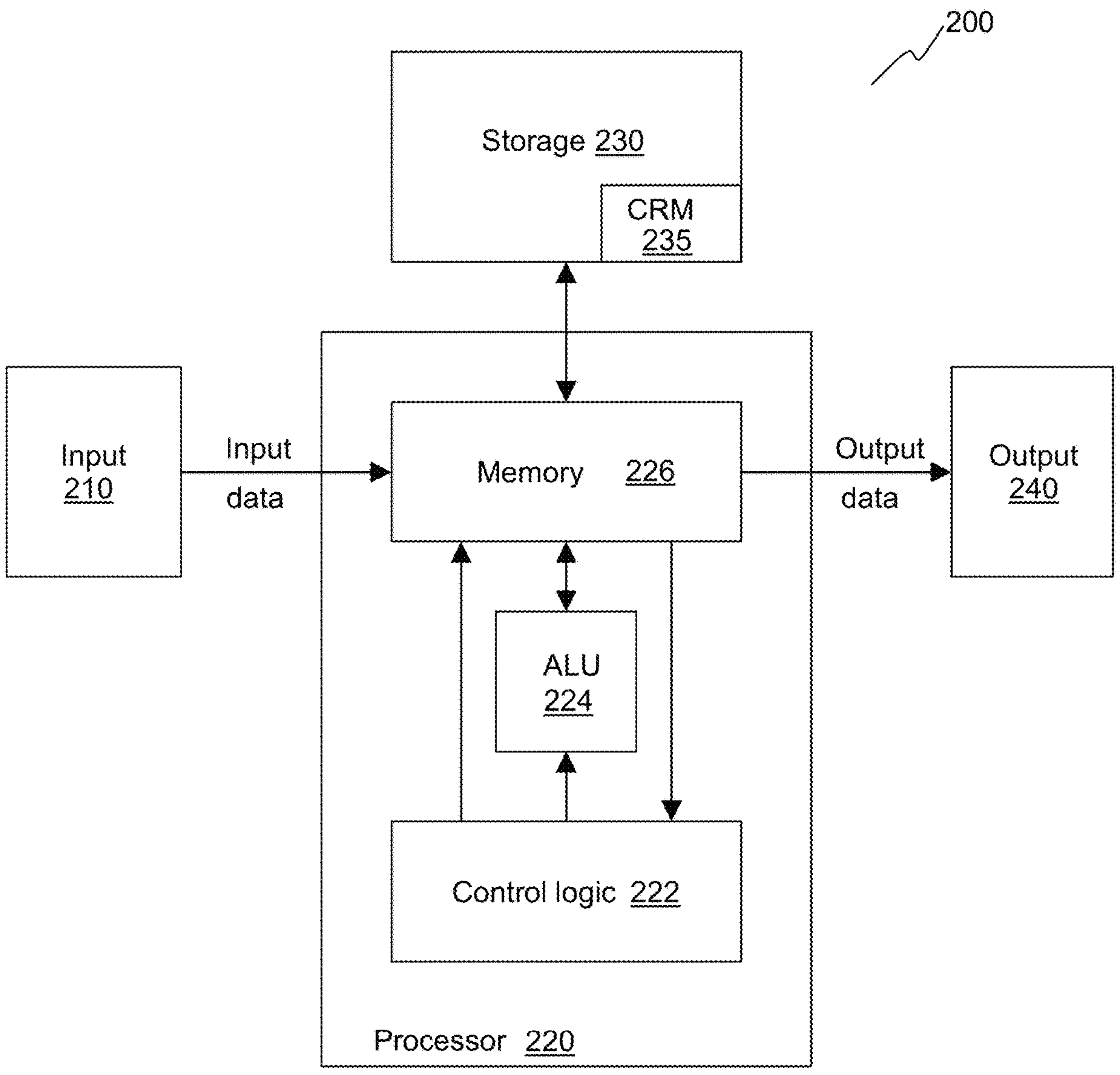
FIG. 2 illustrates an example of a computer, including an input device, a processor, a storage device, and an output device.

FIG. 2 illustrates an example of a computer 200, including an input device 210, a processor 220, a storage device 230, and an output device 240. Although the example computer 200 is drawn with a single processor, other implementations may have multiple processors. Input device 210 may comprise a mouse, a keyboard, a sensor, an input port (for example, a universal serial bus (USB) port), and any other input device known in the art. Output device 240 may comprise a monitor, printer, and any other output device known in the art. Furthermore, part or all of input device 210 and output device 240 may be combined in a network interface, such as a Peripheral Component Interconnect Express (PCIe) interface suitable for communicating with CGR processor 110. Input device 210 is coupled with processor 220 to provide input data, which in an implementation may store in memory 226. Processor 220 is coupled with output device 240 to provide output data from memory 226 to output device 240. Processor 220 further includes control logic 222, operable to control memory 226 and arithmetic and logic unit (ALU) 224, and to receive program and configuration data from memory 226. Control logic 222 further controls exchange of data between memory 226 and storage device 230. Memory 226 typically comprises memory with fast access, such as static random-access memory (SRAM), whereas storage device 230 typically comprises memory with slow access, such as dynamic random-access memory (DRAM), flash memory, magnetic disks, optical disks, and any other memory type known in the art. At least a part of the memory in storage device 230 includes a non-transitory computer-readable medium (CRM 235), such as used for storing computer programs.

Figure 3:
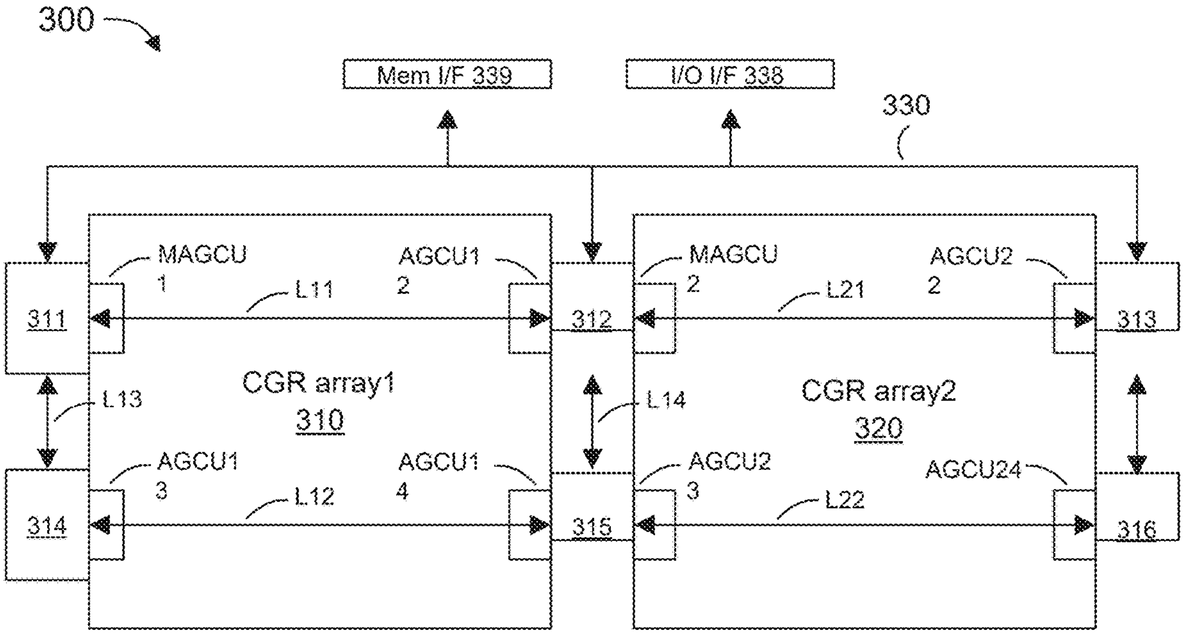
FIG. 3 illustrates example details of a CGR architecture including a top-level network (TLN) and two CGR arrays.

FIG. 3 illustrates example details of a CGR architecture 300 including a top-level network (TLN 330) and two CGR arrays (CGR array1 310 and CGR array2 320). The CGR arrays may also be referred to as "tiles." As such, the CGR array1 310 may be referred to as "tile1 310" and the CGR array2 320 may be referred to as "tile2 320."

A CGR array comprises an array of CGR units (e.g., PMUs, PCUs, FCMUs) coupled via an array-level network (ALN), e.g., a bus system. The ALN is coupled with the TLN 330 through several AGCUs, and consequently with I/O interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN and external devices, such as high-capacity memory, host processors, other CGR processors, FPGA devices, and so on, that are coupled with the interfaces.

Each depicted CGR array has four AGCUs (e.g., MAGCU1, AGCU12, AGCU13, and AGCU14 in CGR array 310). The AGCUs interface the TLN to the ALNs and route data from the TLN to the ALN or vice versa.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN is constructed using top-level switches (switch 311, switch 312, switch 313, switch 314, switch 315, and switch 316) coupled with each other as well as with other circuits on the TLN, including the AGCUs, and external I/O interface 338. The TLN includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
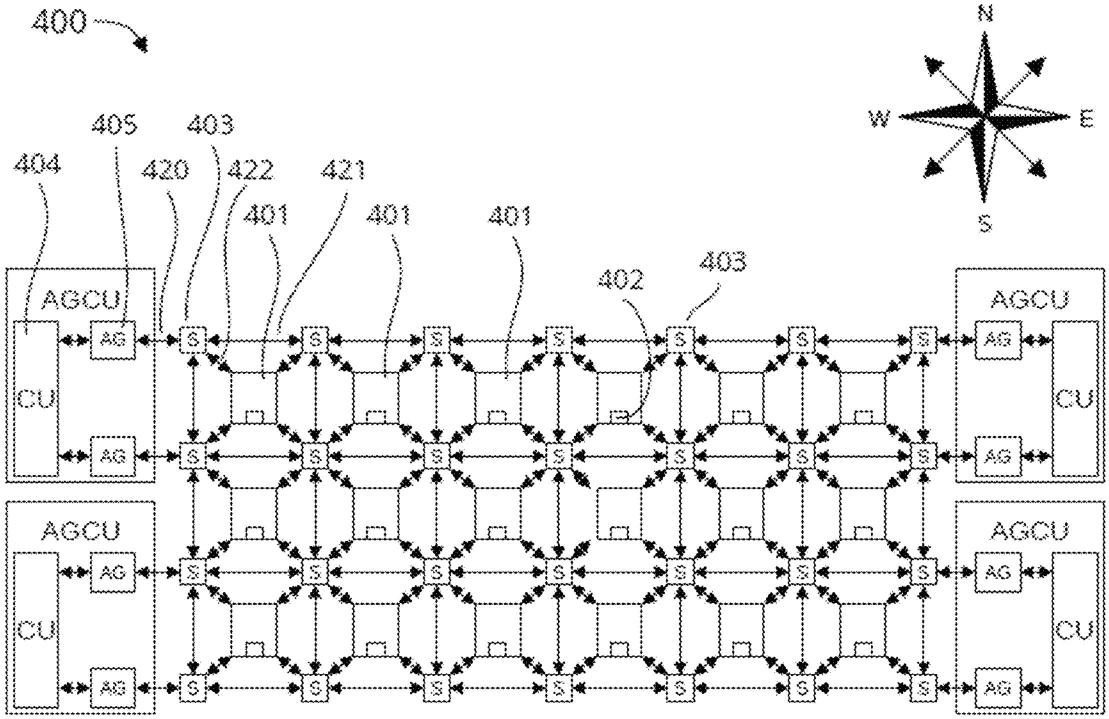
FIG. 4 illustrates an example CGR array, including an array of configurable nodes in an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017 Jun. 24-28, 2017, Toronto, ON, Canada. Each of the CGR units may include a configuration store 402 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns. The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections, and switch units 403 are CGR units. In other implementations, switches route data via the available links based on address information in packet headers, and communication channels establish as and when needed.

A configuration file may include configuration data representing an initial configuration, or starting state, of each of the CGR units that execute a high-level program with user algorithms and functions. Program load is the process of setting up the configuration stores in the CGR array based on the configuration data to allow the CGR units to execute the high-level program. Program load may also require loading memory units and/or PMUs.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit, as shown in the example of FIG. 4, may have eight interfaces. The North, South, East and West interfaces of a switch unit may be used for links between switch units using interconnects 421. The Northeast, Southeast, Northwest and Southwest interfaces of a switch unit may each be used to make a link with an FCMU, PCU or PMU instance using one of the interconnects 422. Two switch units in each CGR array quadrant have links to an AGCU using interconnects 420. The AGCU coalescing unit arbitrates between the AGs and processes memory requests. Each of the eight interfaces of a switch unit can include a vector interface, a scalar interface, and a control interface to communicate with the vector network, the scalar network, and the control network. In other implementations, a switch unit may have any number of interfaces.

During execution of a graph or subgraph in a CGR array after configuration, data can be sent via one or more switch units and one or more links between the switch units to the CGR units using the vector bus and vector interface(s) of the one or more switch units on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGCUs).

Figure 4A:
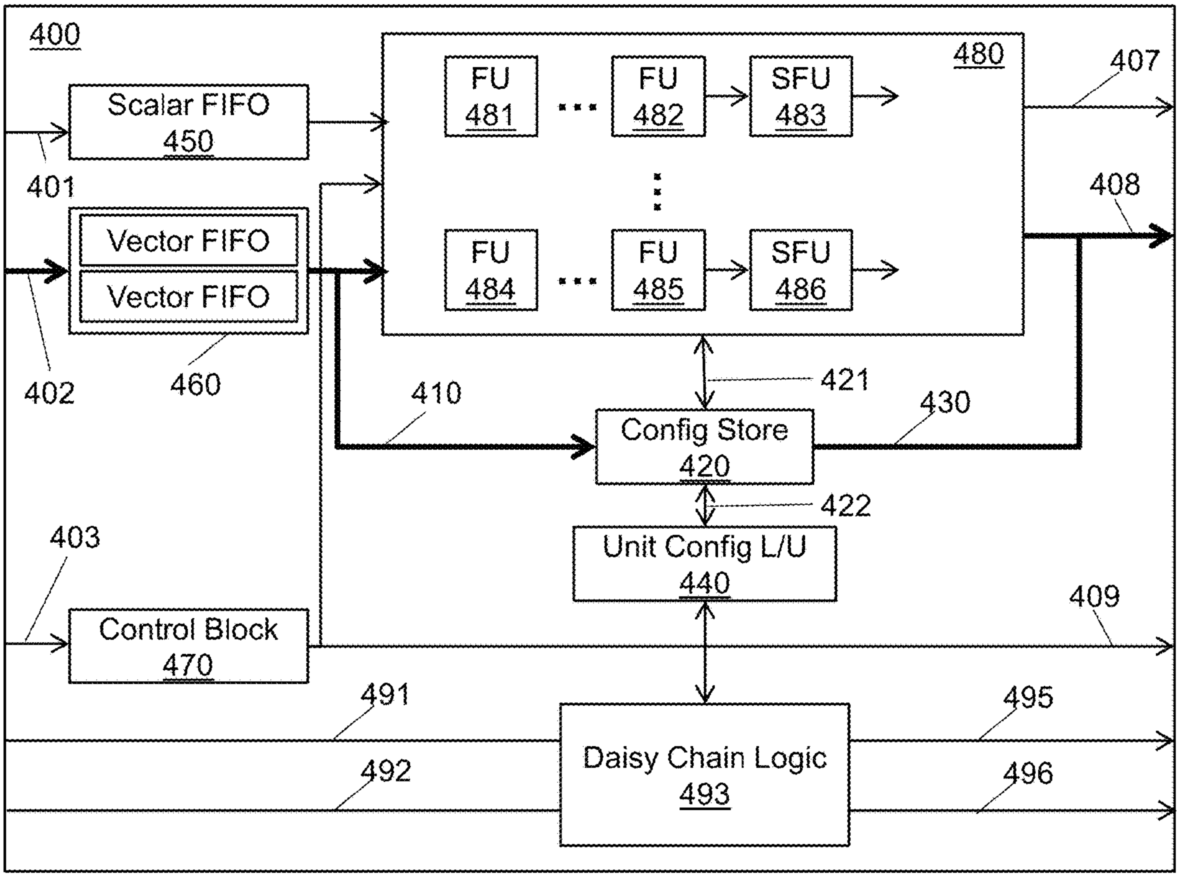
FIG. 4A is a block diagram illustrating an example configurable compute unit.

FIG. 4A is a block diagram illustrating an example configurable unit 401, such as a Pattern Compute Unit (PCU). A configurable unit can interface with the scalar, vector, and control buses, in this example using three corresponding sets of inputs and outputs: scalar inputs/outputs, vector inputs/outputs, and control inputs/outputs. Scalar IOs can be used to communicate single words of data (e.g., 32 bits). Vector IOs can be used to communicate chunks of data (e.g., 128 bits), in cases such as receiving configuration data in a unit configuration load process and transmitting and receiving data during operation after configuration across a long pipeline between multiple PCUs. Control IOs can be used to communicate signals on control lines such as the start or end of execution of a configurable unit. Control inputs are received by control block 470, and control outputs are provided by the control block 470.

Each vector input is buffered in this example using a vector FIFO in a vector FIFO block 460 which can include one or more vector FIFOs. Likewise in this example, each scalar input is buffered using a scalar FIFO 455. Using input FIFOs decouples timing between data producers and consumers and simplifies inter-configurable-unit control logic by making it robust to input delay mismatches.

A configurable unit includes multiple reconfigurable datapaths in block 480. A datapath in a configurable unit can be organized as a multi-stage (Stage 1 . . . . Stage N), reconfigurable SIMD (Single Instruction, Multiple Data) pipeline. The chunks of data pushed into the configuration serial chain in a configurable unit include configuration data for each stage of each datapath in the configurable unit. The configuration serial chain in the configuration data store 425 is connected to the multiple datapaths in block 480 via line 435.

A configurable datapath organized as a multi-stage pipeline can include multiple functional units (e.g., 481, 482, 483; 484, 485, 486) at respective stages. A special functional unit SFU (e.g., 483, 486) in a configurable datapath can include a configurable module 487 that comprises sigmoid circuits and other specialized computational circuits, the combinations of which can be optimized for particular implementations. In one embodiment, a special functional unit can be at the last stage of a multi-stage pipeline and can be configured to receive an input line X from a functional unit (e.g., 482, 486) at a previous stage in a multi-stage pipeline. In some embodiments, a configurable unit like a PCU can include many sigmoid circuits, or many special functional units which are configured for use in a particular graph using configuration data.

Configurable units in the array of configurable units include configuration data stores 425 (e.g., serial chains) to store unit files comprising a plurality of chunks (or sub-files of other sizes) of configuration data particular to the corresponding configurable units. Configurable units in the array of configurable units each include unit configuration load logic 440 connected to the configuration data store 425 via line 461, to execute a unit configuration load process. The unit configuration load process includes receiving, via the bus system (e.g., the vector inputs), chunks of a unit file particular to the configurable unit and loading the received chunks into the configuration data store 425 of the configurable unit. The unit file loaded into the configuration data store 425 can include configuration data, including opcodes and routing configuration, for circuits implementing a matrix multiply as described with reference to FIGS. 6-12.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

Input configuration data 410 can be provided to a vector FIFO as vector inputs, and then be transferred to the configuration data store 425. Output configuration data 430 can be unloaded from the configuration data store 425 using the vector outputs.

The CGRA uses a daisy-chained completion bus to indicate when a load/unload command has been completed. The master AGCU transmits the program load and unload commands to configurable units in the array of configurable units over a daisy-chained command bus. As shown in the example of FIG. 4, a daisy-chained completion bus 491 and a daisy-chained command bus 492 are connected to daisy-chain logic 493, which communicates with the unit configuration load logic 440. The daisy-chain logic 493 can include load complete status logic, as described below. The daisy-chained completion bus is further described below. Other topologies for the command and completion buses are clearly possible but not described here.

Figure 5:
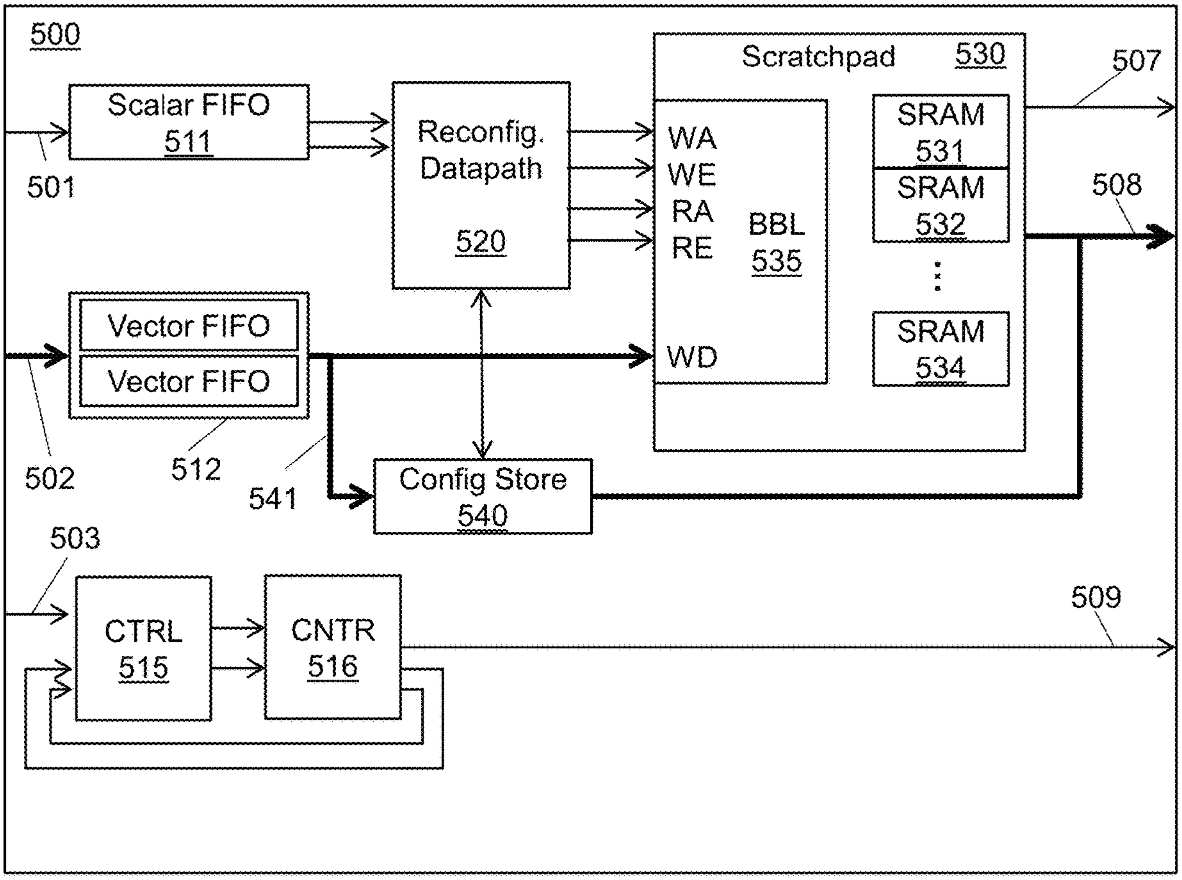
FIG. 5 illustrates an example of a pattern memory unit (PMU) and a pattern compute unit (PCU), which may be combined in a fused-control memory unit (FCMU).

FIG. 5 is a block diagram illustrating an example configurable pattern memory unit (PMU) including an instrumentation logic unit. A PMU can contain scratchpad memory 530 coupled with a reconfigurable scalar data path 520 intended for address calculation (RA, WA) and control (WE, RE) of the scratchpad memory 530, along with the bus interfaces used in the PCU (FIG. 4A). PMUs can be used to distribute on-chip memory throughout the array of reconfigurable units. In one embodiment, address calculation within the memory in the PMUs is performed on the PMU datapath, while the core computation is performed within the PCU.

The bus interfaces can include scalar inputs, vector inputs, scalar outputs and vector outputs, usable to provide write data (WD). The data path can be organized as a multi-stage reconfigurable pipeline, including stages of functional units (FUs) and associated pipeline registers (PRs) that register inputs and outputs of the functional units. PMUs can be used to store distributed on-chip memory throughout the array of reconfigurable units.

A scratchpad is built with multiple SRAM banks (e.g., 531, 532, 533, 534). Banking and buffering logic 535 for the SRAM banks in the scratchpad can be configured to operate in several banking modes to support various access patterns. A computation unit as described herein can include a lookup table stored in the scratchpad memory 530, from a configuration file or from other sources. In a computation unit as described herein, the reconfigurable scalar data path 520 can translate a section of a raw input value I for addressing lookup tables implementing a function f(I), into the addressing format utilized by the scratchpad memory 530, adding appropriate offsets and so on, to read the entries of the lookup table stored in the scratchpad memory 530 using the sections of the input value I. Each PMU can include write address calculation logic and read address calculation logic that provide write address WA, write enable WE, read address RA and read enable RE to the banking buffering logic 535. Based on the state of the local FIFOs 511 and 519 and external control inputs, the control block 515 can be configured to trigger the write address computation, read address computation, or both, by enabling the appropriate counters 516. More specifically, the counters 516, which can be a programmable counter chain 516 (Control Inputs, Control Outputs) and control block 515 can trigger PMU execution.

Instrumentation logic 518 is included in this example of a configurable unit. The instrumentation logic 518 can be part of the control block 515 or implemented as a separate block on the device. The instrumentation logic 518 is coupled to the control inputs and to the control outputs. Also, the instrumentation logic 518 is coupled to the control block 515 and the counter chain 516, for exchanging status signals and control signals in support of a control barrier network configured as discussed above.

This is one simplified example of a configuration of a configurable processor for implementing a computation unit as described herein. The configurable processor can be configured in other ways to implement a computation unit. Other types of configurable processors can implement the computation unit in other ways. Also, the computation unit can be implemented using dedicated logic in some examples, or a combination of dedicated logic and instruction-controlled processors.

Figure 5A:
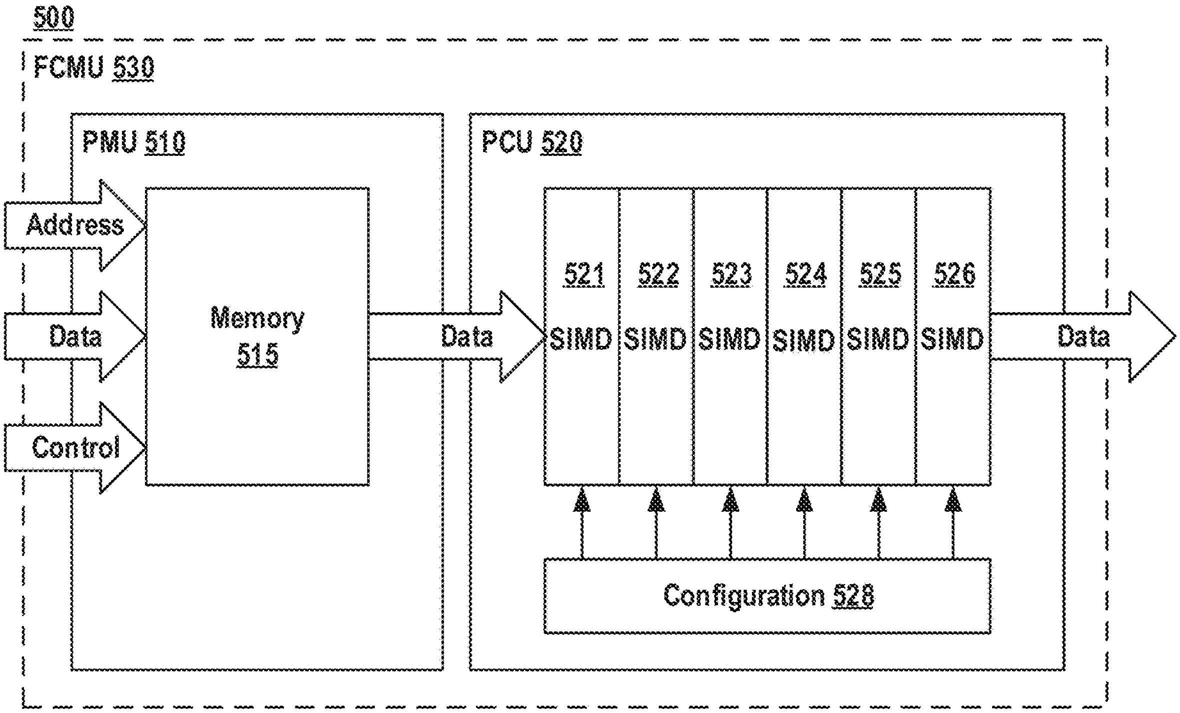
FIG. 5A illustrates an example of a pattern memory unit (PMU) and a pattern compute unit (PCU), which may be combined in a fused-control memory unit (FCMU).

FIG. 5A illustrates an example 500 of a PMU 550 and a PCU 560, which may be combined in an FCMU 540. PMU 550 may be directly coupled to PCU 560, or optionally via one or more switches. PMU 550 includes a scratchpad memory 530, which may receive external data, memory addresses, and memory control information (write enable, read enable) via one or more buses included in the ALN. PCU 560 includes two or more processor stages, such as SIMD 521 through SIMD 526, and configuration store 528. The processor stages may include ALUs, or SIMDs, as drawn, or any other reconfigurable stages that can process data.

Each stage in PCU 560 may also hold one or more registers (not drawn) for short-term storage of parameters. Short-term storage, for example during one to several clock cycles or unit delays, allows for synchronization of data in the PCU pipeline.

Figure 6:
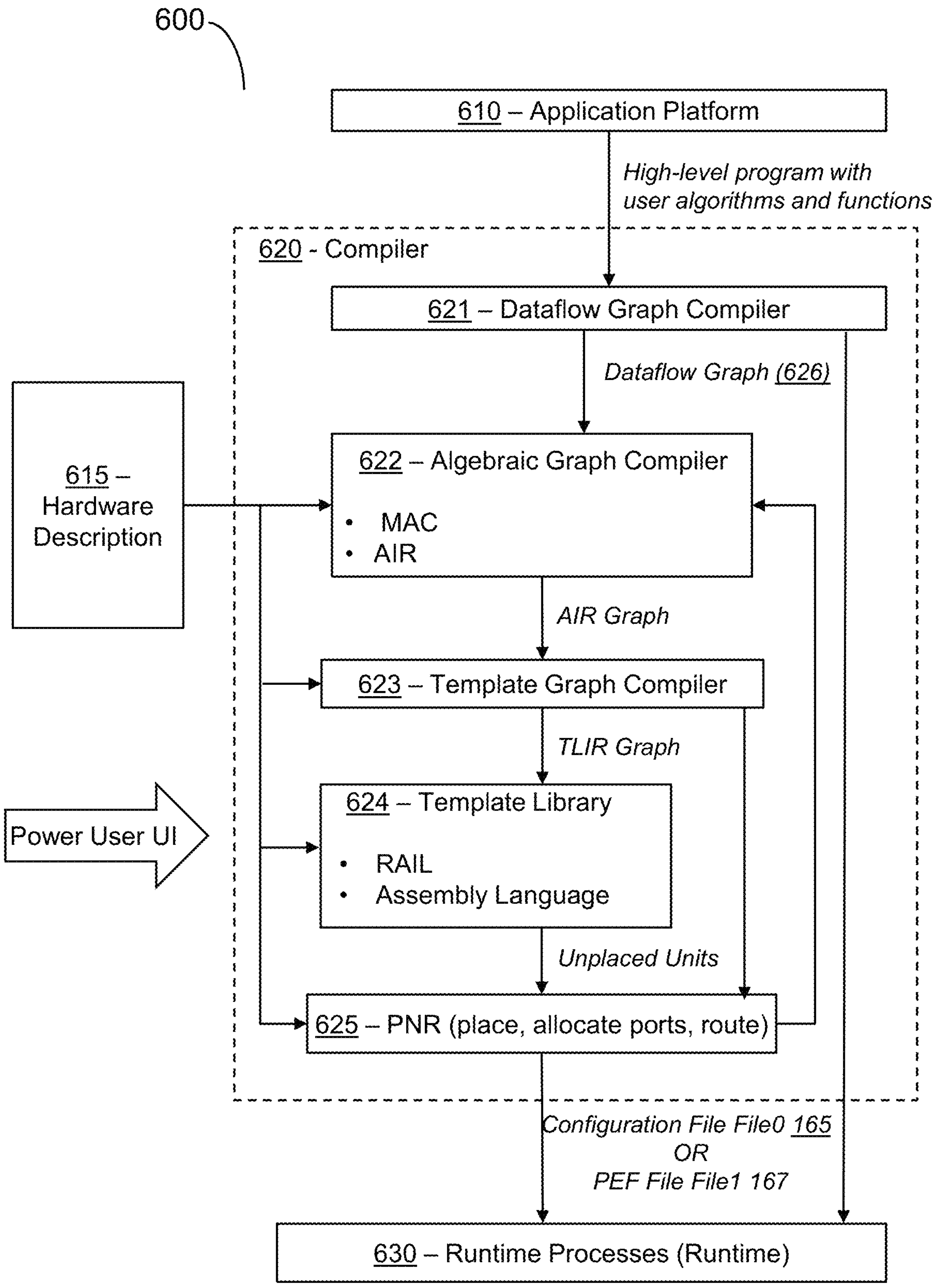
FIG. 6 is a block diagram of a compiler stack implementation suitable for generating a configuration file for a CGR processor.

FIG. 6 is a block diagram of a compiler stack 600 implementation suitable for generating a configuration file for a CGR processor. FIGS. 7 to 11 illustrate various representations of an example user program 700 corresponding to various stages of a compiler stack such as compiler stack 600. As depicted, compiler stack 600 includes several stages to convert a high-level program (e.g., user program 700) with statements 710 that define user algorithms and functions, e.g., algebraic expressions and functions, to configuration data for the CGR units.

Compiler stack 600 may take its input from application platform 610, or any other source of high-level program statements suitable for parallel processing, which provides a user interface for general users. It may further receive hardware description 615, for example defining the physical units in a reconfigurable data processor or CGRA processor. Application platform 610 may include libraries such as PyTorch, TensorFlow, ONNX, Caffe, and Keras to provide user-selected and configured algorithms. The example user program 700 depicted in FIG. 7 comprises statements 710 that invoke various PyTorch functions.

Figure 6A:
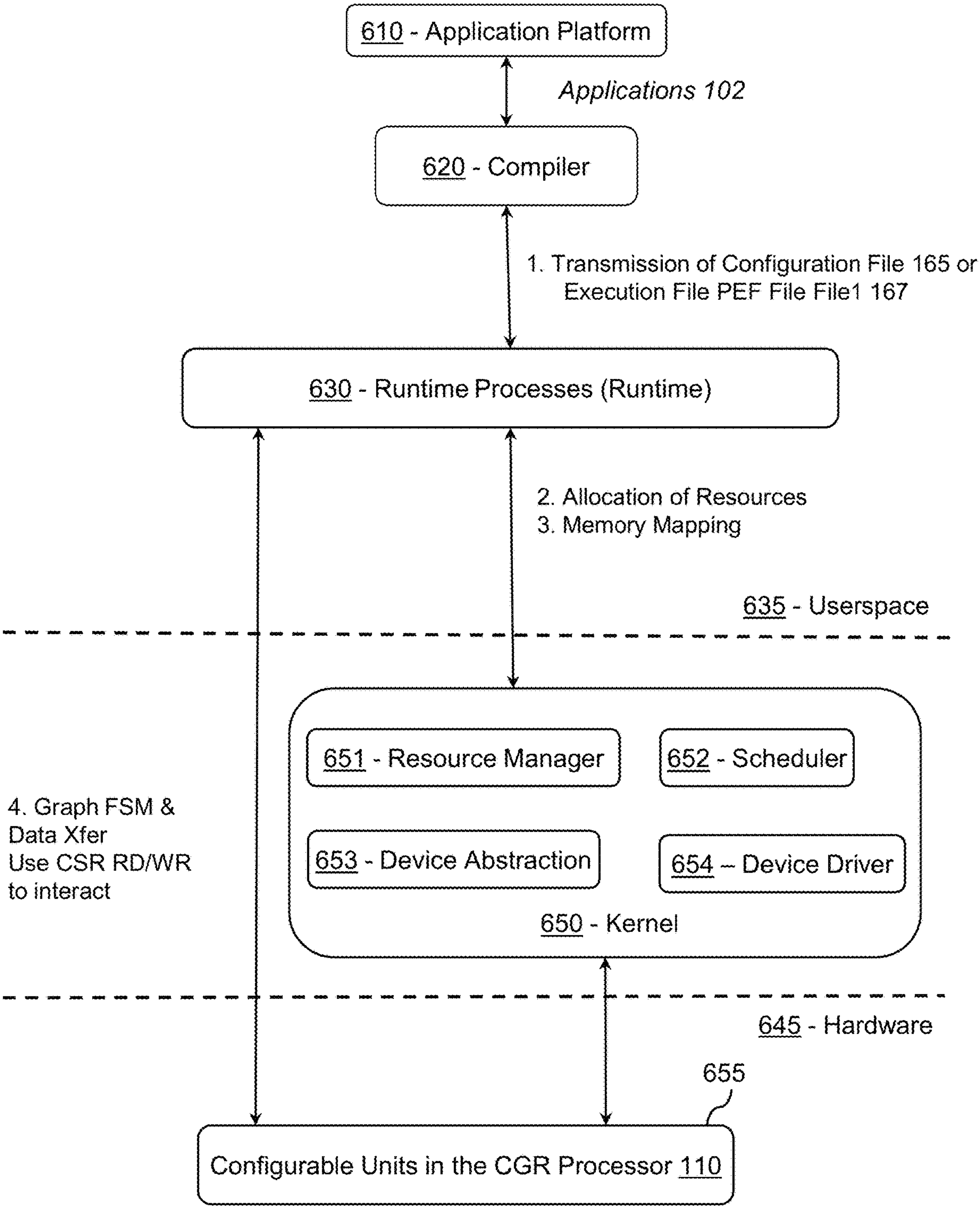
FIG. 6A illustrates an example system diagram of including a compile suitable for generating a configuration file and further showing an example details of a runtime for a CGR processor.

FIG. 6A illustrates an example system diagram of including a compile suitable for generating a configuration file and further showing an example details of a runtime for a CGR processor.

More specifically, FIG. 6A shows one implementation of a single-user execution flow used by the runtime processes 630 to execute the applications received via the application platform 610. FIG. 6A depicts one implementation of data exchange between various components of the runtime 630 to execute the applications in the CGR processor 110. The runtime 630 abstracts out multiple reconfigurable processor devices, including their hardware resources (e.g., arrays and subarrays of configurable units, DMA channels, and device memory), into a single virtual reconfigurable processor device for the applications running in the user space.

The kernel module 650 dynamically discovers reconfigurable processor devices in the pool of reconfigurable data flow resources 655 during module initialization and presents them as a single virtual device/dev/rdu (which may be a virtual reconfigurable dataflow unit) to the applications 102 running in the user space. As a result, each reconfigurable processor device acts as a core and each subarray of configurable units (e.g., tile) acts as a hardware thread, which can be dynamically allocated to a process by the resource manager 651 of the kernel module 650.

The kernel 322 includes a resource manager 651, a scheduler 652, a device abstraction module 653, and a device driver 654. The resource manager 651 manages the host memory and the device memory (e.g., on-chip and off-chip memory of the reconfigurable processors) and provides efficient allocation/free functions for the applications 102 and binary data (e.g., bit files, data, arguments, segments, symbols, etc.) in the execution file 156. The scheduler 472 manages queuing and mapping of the configuration files for the applications 102 depending on the availability of the hardware resources.

The device abstraction module 473 scans all the reconfigurable processors in the pool of reconfigurable data flow resources 178 and presents them as a single virtual reconfigurable processor device to the user.

FIG. 7 shows an example implementation of an example user program 700 in a first stage of a compiler stack. The example user program 700 generates a random tensor X1 with a normal distribution in the RandN node. It provides then tensor to a neural network cell that performs a weighing function (in the Linear node) followed by a rectified linear unit (ReLU) activation function, which is followed by a Softmax activation function, for example to normalize the output to a probability distribution over a predicted output class. FIG. 7 does not show the weights and bias used for the weighing function.

Application platform 610 outputs a high-level program to compiler 620 (which is an example of the compiler 160 shown in FIG. 1) which in turn outputs a configuration file to the reconfigurable data processor or CGRA processor where it is executed in runtime 630. The runtime 630 can be an example of the runtime 170 shown in FIG. 1. Compiler 620 may include dataflow graph compiler 621, which may handle a dataflow graph, algebraic graph compiler 622, template graph compiler 623, template library 624, and placer and router PNR 625. In some implementations, template library 624 includes RDU abstract intermediate language (RAIL) and/or assembly language interfaces for power users.

Dataflow graph compiler 621 converts the high-level program with user algorithms and functions from application platform 610 to one or more dataflow graphs. The high-level program may be suitable for parallel processing, and therefore parts of the nodes of the dataflow graphs may be intrinsically parallel unless an edge in the graph indicates a dependency. Dataflow graph compiler 621 may provide code optimization steps like false data dependency elimination, dead-code elimination, and constant folding. The dataflow graphs encode the data and control dependencies of the high-level program. Dataflow graph compiler 621 may support programming a reconfigurable data processor at higher or lower-level programming languages, for example from an application platform 610 to C++ and assembly language. In some implementations, dataflow graph compiler 621 allows programmers to provide code that runs directly on the reconfigurable data processor. In other implementations, dataflow graph compiler 621 provides one or more libraries that include predefined functions like linear algebra operations, element-wise tensor operations, nonlinearities, and reductions required for creating, executing, and profiling the dataflow graphs on the reconfigurable processors. Dataflow graph compiler 621 may provide an application programming interface (API) to enhance functionality available via the application platform 610.

Algebraic graph compiler 622 may include a model analyzer and compiler (MAC) layer that makes high-level mapping decisions for (sub-graphs of the) dataflow graph based on hardware constraints. It may support various application frontends such as Samba, JAX, and TensorFlow/HLO. Algebraic graph compiler 622 may also transform the graphs by automatically generating gradient computing graphs, perform stitching between sub-graphs, for performance and latency estimation, convert dataflow graph operations to AIR operation, perform tiling, sharding (database partitioning) and other operations, and model the parallelism that can be achieved on the dataflow graphs.

Algebraic graph compiler 622 may further include an arithmetic or algebraic intermediate representation (AIR) level that translates high-level graph and mapping decisions provided by the MAC layer into explicit AIR graphs. Key responsibilities of the AIR level include legalizing the graph and mapping decisions of the MAC, expanding data parallel, tiling, metapipe, region instructions provided by the MAC, inserting stage buffers and skip buffers, eliminating redundant operations, buffers and sections, and optimizing for resource use, latency, and throughput. The AIR layer constructs pipelines based on MAC mapping decisions by placing operations into a metapipe and inserting stage buffers between them. It may also insert AllReduce instructions for collecting results from parallelized operations. It may also further optimize by redundant operation and dead code elimination, pipeline collapsing, and operation fusion.

FIG. 8 shows an example implementation of user program 700 in the second stage of the compiler stack. At this stage, the algebraic graph compiler replaces the Softmax macro by its constituents. The Softmax function is given as e^{z_i}/(Σ__(j=1)^K e^({z_j})). This function includes an exponential component, a summation, and a division. Thus, algebraic graph compiler 622 replaces the user program statements 710, also shown as computation graph 750, by AIR/Tensor statements 800, also shown as Air/Tensor computation graph 850.

Template graph compiler 623 may translate AIR statements and/or graphs into TLIR statements 900 (see FIG. 9) and/or graphs (graph 950 is shown), optimizing for the target hardware architecture into unplaced variable-sized units (referred to as logical CGR units) suitable for PNR 625. Template graph compiler 623 may allocate meta-pipelines, such as meta-pipeline 910 and meta-pipeline 920, for sections of the template dataflow statements 900 and corresponding sections of unstitched template computation graph 950. Template graph compiler 623 may add further information (name, inputs, input names and dataflow description) for PNR 625 and make the graph physically realizable through each performed step. Template graph compiler 623 may for example provide translation of AIR graphs to specific model operation templates such as for general matrix multiplication (GeMM). An implementation may convert part or all intermediate representation operations to templates, stitch templates into the dataflow and control flow, insert necessary buffers and layout transforms, generate test data and optimize for hardware use, latency, and throughput.

Template library 624 provides templates for commonly used operations, for example GEMM. Templates are implemented using assembly language. Templates are further compiled by an assembler that provides an architecture-independent low-level programming interface as well as optimization and code generation for the target hardware. Responsibilities of the assembler may include address expression compilation, intra-unit resource allocation and management, making a template graph physically realizable with target-specific rules, low-level architecture-specific transformations and optimizations, and architecture-specific code generation.

Figure 10:
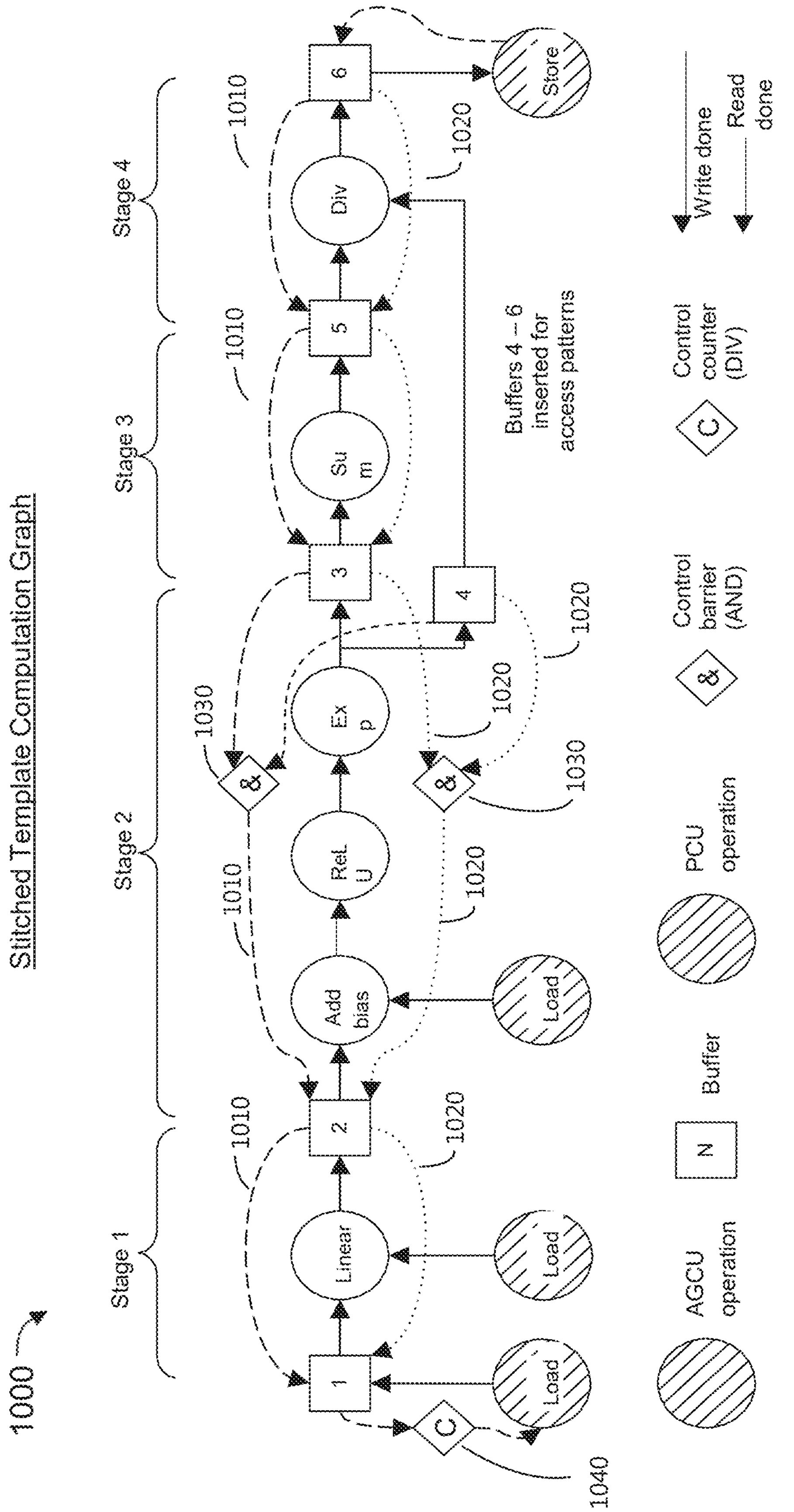
FIG. 10 shows an example implementation of the example user program in a fourth stage of a compiler stack.

FIG. 10 shows an example implementation of the example user program 700 in a fourth stage of the compiler stack. The template graph compiler 623 may also determine the control signals 1010 and 1020, as well as control gates 1030 and 1040 required to enable the CGR units (whether logical or physical) to coordinate dataflow between the CGR units in the CGR array of a CGR processor. This process, sometimes referred to as stitching, produces a stitched template compute graph 1000 with control signals 1010-1020 and control gates 1030-1040. In the example depicted in FIG. 10, the control signals include write done signals 1010 and read done signals 1020, and the control gates include 'AND' gates 1030 and a counting or 'DIV' gate 1040. The control signals and control gates enable coordinated dataflow between the configurable units of CGR processors such as compute units, memory units, and AGCUs.

PNR 625 translates and maps logical (i.e., unplaced physically realizable) CGR units (e.g., the nodes of the logical computation graph 1100 shown in FIG. 11) to a physical layout (e.g., the physical layout 1150 shown in FIG. 11) on the physical level, e.g., a physical array of CGR units in a semiconductor chip. PNR625 also determines physical data channels to enable communication among the CGR units and between the CGR units and circuits coupled via the TLN; allocates ports on the CGR units and switches; provides configuration data and initialization data for the target hardware; and produces configuration files, e.g., processor-executable format (PEF) files. It may further provide bandwidth calculations, allocate network interfaces such as AGCUs and virtual address generators (VAGs), provide configuration data that allows AGCUs and/or VAGs to perform address translation, and control ALN switches and data routing. PNR 625 may provide its functionality in multiple steps and may include multiple modules (not shown in FIG. 6) to provide the multiple steps, e.g., a placer, a router, a port allocator, and a PEF file generator. PNR 625 may receive its input data in various ways. For example, it may receive parts of its input data from any of the earlier modules (dataflow graph compiler 621, algebraic graph compiler 622, template graph compiler 623, and/or template library 624). In some implementations, an earlier module, such as template graph compiler 623, may have the task of preparing all information for PNR 625 and no other units provide PNR input data directly.

Further implementations of compiler 620 provide for an iterative process, for example by feeding information from PNR 625 back to an earlier module, so that the earlier module can execute a new compilation step in which it uses physically realized results rather than estimates of or place-holders for physically realizable circuits. For example, PNR 625 may feed information regarding the physically realized circuits back to algebraic graph compiler 622.

Memory allocations represent the creation of logical memory spaces in on-chip and/or off-chip memories for data required to implement the dataflow graph, and these memory allocations are specified in the configuration file. Memory allocations define the type and the number of hardware circuits (functional units, storage, or connectivity components). Main memory (e.g., DRAM) may be off-chip memory, and scratchpad memory (e.g., SRAM) is on-chip memory inside an RDU. Other memory types for which the memory allocations can be made for various access patterns and layouts include cache, read-only look-up tables (LUTs), serial memories (e.g., FIFOs), and register files.

Compiler 620 binds memory allocations to unplaced memory units and binds operations specified by operation nodes in the dataflow graph to unplaced compute units, and these bindings may be specified in the configuration data. In some implementations, compiler 620 partitions parts of a dataflow graph into multiple subgraphs such as memory subgraphs or compute subgraphs and specifies these subgraphs in the PEF file1 167. A memory subgraph may comprise address calculations leading up to a memory access. A compute subgraph may comprise all other operations in the parent graph. In one implementation, a parent graph is broken up into multiple memory subgraphs and exactly one compute subgraph. A single parent graph can produce one or more memory subgraphs, depending on how many memory accesses exist in the original loop body. In cases where the same memory addressing logic is shared across multiple memory accesses, address calculation may be duplicated to create multiple memory subgraphs from the same parent graph.

Compiler 620 generates the configuration files with configuration data (e.g., a bit stream) for the placed positions and the routed data and control networks. In one implementation, this includes assigning coordinates and communication resources of the physical CGR units by placing and routing unplaced units onto the array of CGR units while maximizing bandwidth and minimizing latency.

After software-stack compilation of dataflow graphs, all compute nodes in the graph are assigned a dedicated pipeline stage with a stage buffer before and after that graph-node. A stage-buffer implementation can range from one to several PMUs and consumes variable on-chip SRAM resources. Compiler 620 may then estimate a latency for each stage in the pipeline and further determine the longest latency for each pipeline. As different nodes require varied compute complexity, some stages consume smaller latency compared to other nodes. In general, a data graph sample that has completed computation at the current stage will wait in a stage buffer before the next stage until the latter computation is complete for another sample. This will be explained in greater detail with regard to FIG. 12.

Figure 12:
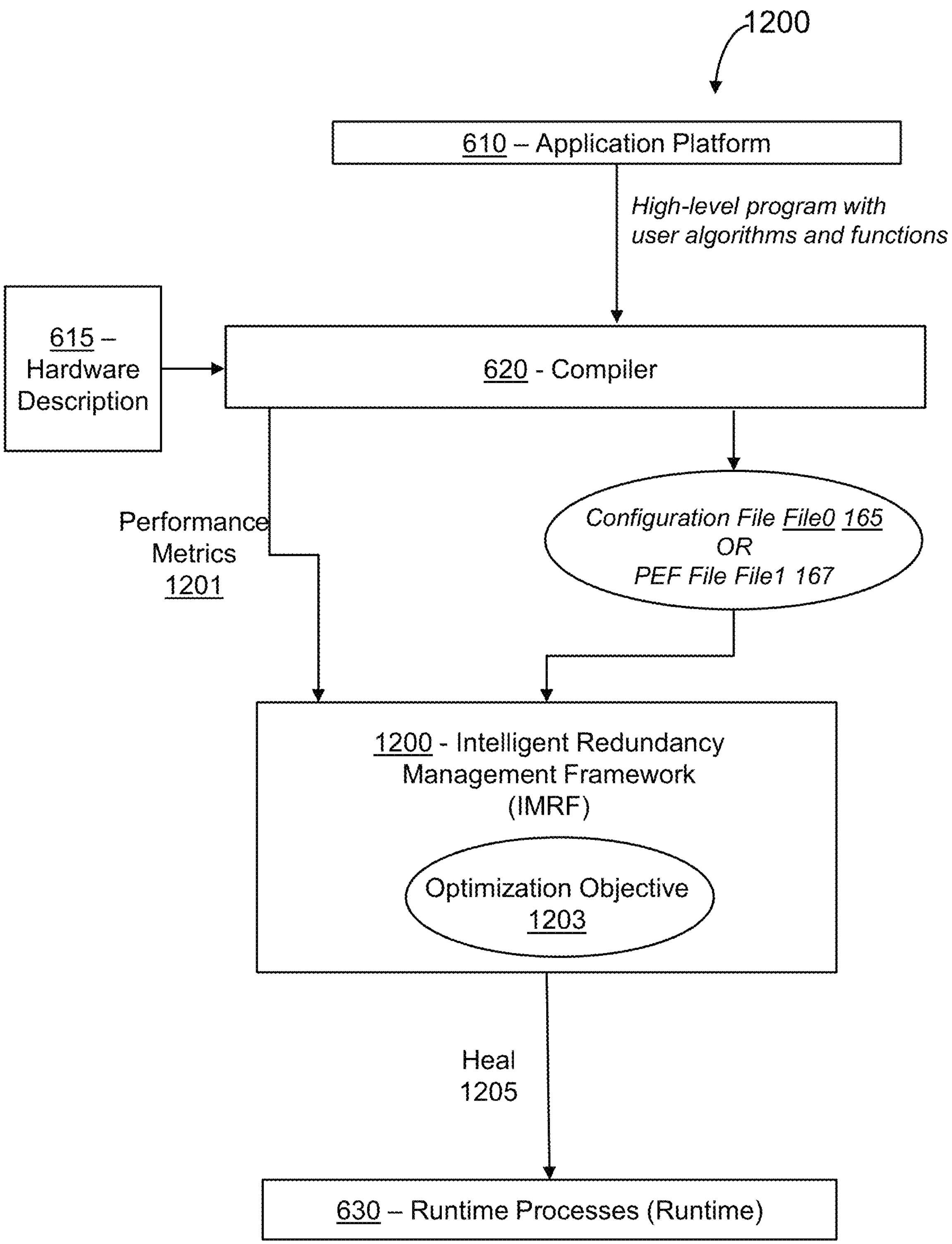
FIG. 12 is an example of a block diagram of including a compiler and an intelligent redundancy management framework (IRMF), and runtime processes (runtime), according to an embodiment of the present disclosure.

FIG. 12 is an example of a block diagram of a compiler stack implementation further including an intelligent redundancy management framework (IRMF), according to an embodiment of the present disclosure. As will be explained with regard to FIGS. 13 to 13B, the IRMF 1200 interacts with the compiler 620 and the runtime 630 for managing utilization of healthy components and self-healing the operations that runtime 630 wants to perform on the CGR processor.

FIG. 12 has many common blocks with FIG. 6. The IRMF 1200 is coupled to interact with the compiler 620 and the runtime 630 to heal the components or configurations in the CGR processor (not shown in FIG. 6.) In one example, the compiler 620 is coupled to provide performance metrics 1201 to the IRMF 1200. The performance metrics 1201 can include current memory bandwidth or latency for a graph-related operation. Based on the performance metrics 1201, the IRMF 1200 can further generate an optimization objective 1204 for healing the components in the CGR processor 110. In some examples, the compiler can generate the optimization objective 1204. The IRMF is further coupled to heal the components either in the configuration file file0 165 or during the runtime 630 as indicated by a heal operation 1205. More details about the performance metrics will be discussed with regards to FIGS. 12A to 12C and later in the specification.

Figure 12A:
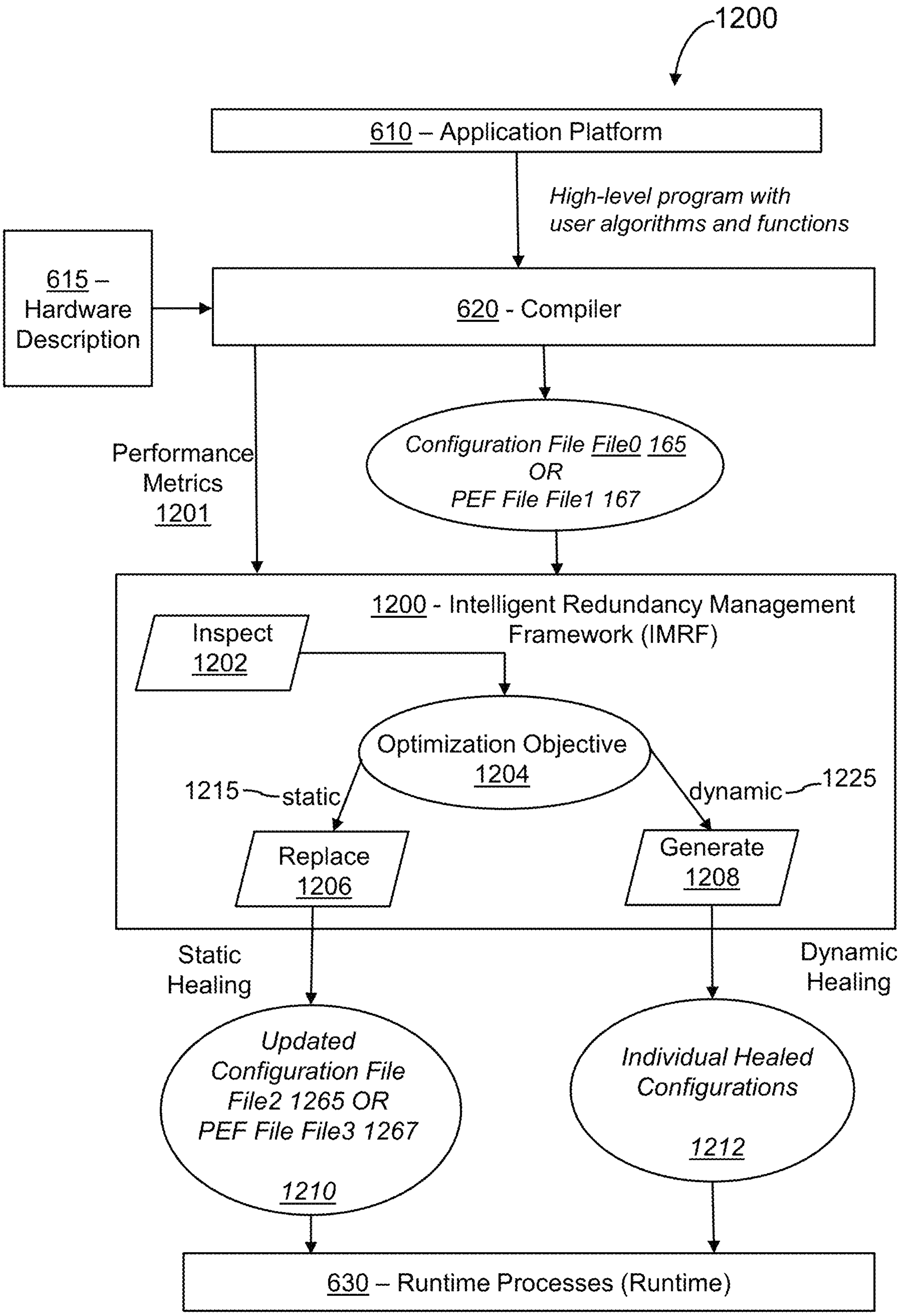
FIG. 12A is an example of a block diagram of including a compiler and an intelligent redundancy management framework (IRMF), runtime processes (runtime), further examples of healing operations, according to an embodiment of the present disclosure.
Figure 12B:
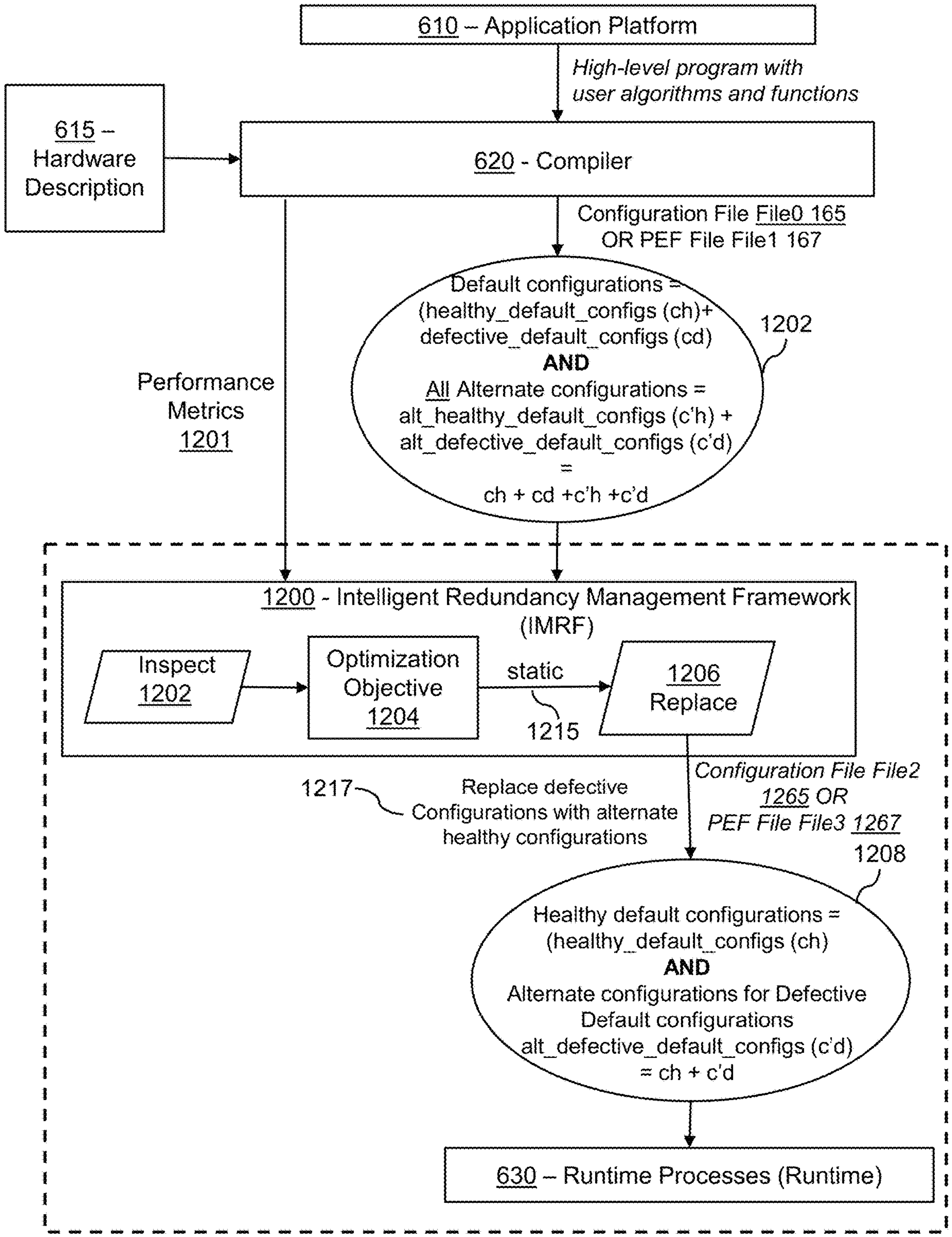
FIG. 12B is an example of a block diagram of including a compiler and an intelligent redundancy management framework (IRMF), runtime processes (runtime), and an example of a static healing operation, according to an embodiment of the present disclosure.
Figure 12C:
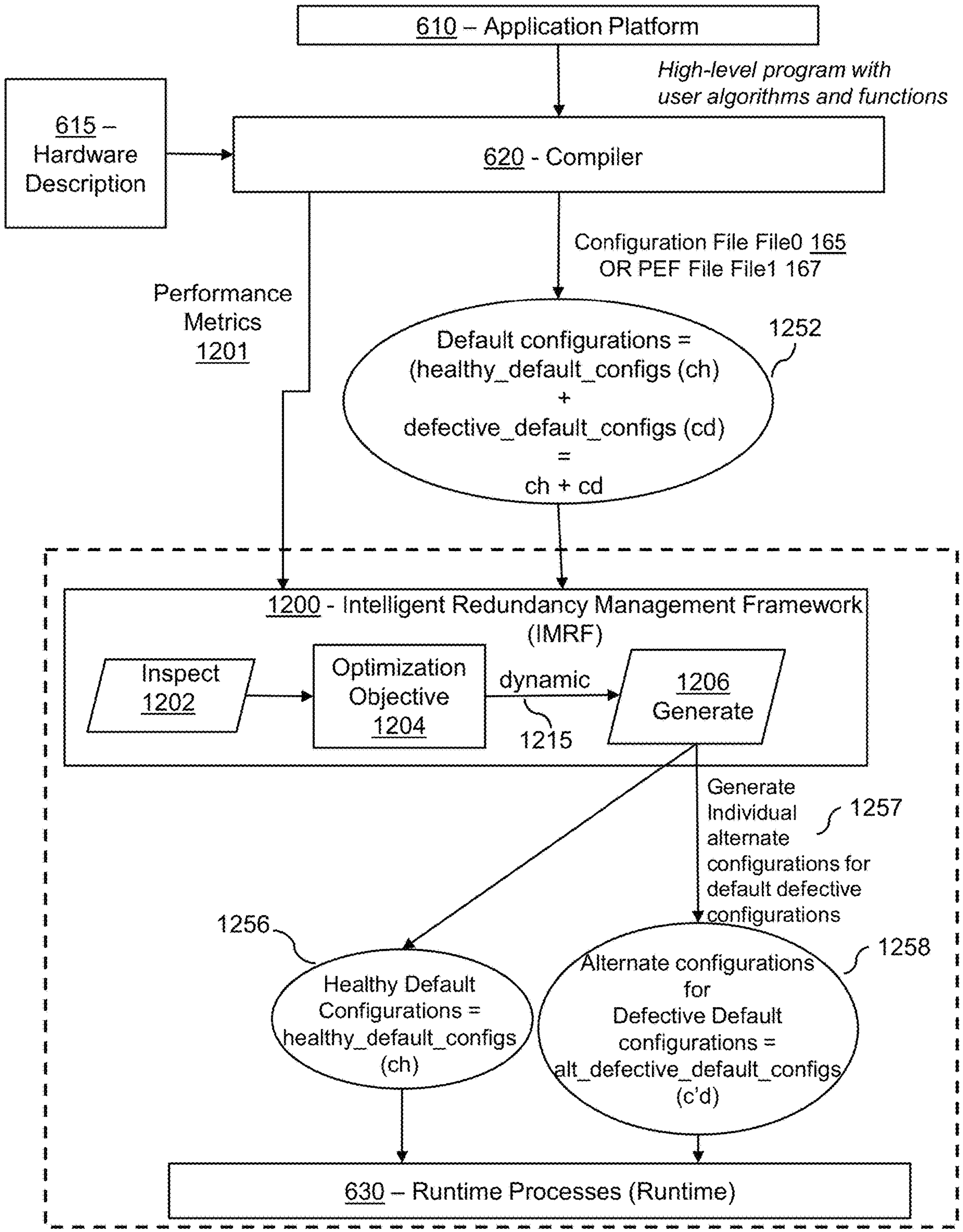
FIG. 12C is an example of a block diagram of including a compiler and an intelligent redundancy management framework (IRMF), runtime processes (runtime), and an example of a dynamic healing operation, according to an embodiment of the present disclosure.

FIGS. 12A to 12C share common blocks with FIG. 12 such as the application platform 610, the hardware description block 615, the compiler 620, the IRMF 1200, and the runtime 630.

FIG. 12A is an example of a block diagram of an implementation including a compiler and an intelligent redundancy management framework (IRMF), runtime processes (runtime), further including examples of healing operations, according to an embodiment of the present disclosure. As shown in FIG. 12A, the IRMF 1200 further includes an inspect logic 1202 and optimization objective logic 1204, a replace logic 1206, and generate logic 1208. In some examples, any of these blocks may be combined in any fashion. The optimization objective block 1203 may generate either a static objective 1215 or dynamic objective 1225, based on which a specific type of healing operation is performed. For example, as the name suggests, if the objective is static, then the IRMF performs static healing and if the objective is dynamic, then the IRMF performs dynamic healing. Furthermore, FIG. 12A illustrates some more details about the configurations included in both static healing and dynamic healing. In one example, in static healing, the IRMF generates an updated configuration file file2 1265 or an updated PEF file3 1267, which includes healed configurations. The configuration file with file2 1265 or an updated PEF file file3 1267 is then provided to the runtime 630. More details about the configurations in static healing this will be explained with respect to FIG. 12B. In dynamic healing, the IRMF 1200 generates individual healed configurations to be provide to the runtime 630. More details about the configurations in dynamic healing will be explained with respect to FIG. 12C.

FIG. 12B is an example of a block diagram of including a compiler and an intelligent redundancy management framework (IRMF), runtime processes (runtime), and an example of a static healing operation, according to an embodiment of the present disclosure. Specifically, shown in FIG. 12B are details of example configurations generated before and after static healing. Initially, the IRMF 1200 receives the configuration file file0 165 generated by the compiler which includes default configurations, some of which may be healthy, and the rest are defective (bad); and alternate configurations for all the default configurations. If it assumed that a default configuration is denoted by (c) and an alternate configuration is denoted by (c'), the healthy default configurations can be referred to as "healthy_default_config" or "ch" and the defective default configuration may be referred to as "defective_default_config" or "cd". Furthermore, alternate configurations for healthy default configurations may be referred to as alt_healthy_default_config" or "c'h" and alternate configurations for defective default configurations may be referred to as alt_defective_default_config" or "c'd". As explained earlier in the specification, in static healing, the configuration file file0 165 pre-emptivley includes alternate configurations for all configurations. As such the configuration file file0 165 includes (ch+cd+c'h+c'd), which is provided to the IRMF 1200. In one example, the optimization objective block 1203 generated the static objective 1215. The inspect logic 1202 is coupled to identify the default defective configurations. The replace logic 1206 is coupled to replace the defective default configurations with their respective alternate configurations as shown by 1217, while retaining the default healthy configurations. It should be understood that all alternate configurations are healthy configurations. The IRMF 1200 then generates an updated configuration file file2 1265 (or PEF file file3 1267) which includes healthy_default_configs (ch) and alt_defective_default_configs (c'd) as in (ch+c'd), which are shown as 1208.

FIG. 12C is an example of a block diagram of including a compiler and an intelligent redundancy management framework (IRMF), runtime processes (runtime), and an example of a dynamic healing operation, according to an embodiment of the present disclosure. In this example, the initial configuration file file0 165 includes only the default configurations i.e. healthy default (healthy_default_configs or ch) or defective default configurations (defective_default_configs or cd). In other words, the configuration file file0 165 include configurations (ch+cd). These are shown as 1252 Unlike static healing, there are no alternate configurations present in the initial configuration file during dynamic healing. Instead, alternate configurations for defective default configurations (c'd) are generated individually during runtime as shown by 1257 and 1258. The default healthy configurations (ch) are provided to the runtime either individually or collectively. As such the configurations that provided to the runtime include (ch+c'd).

Figure 13:
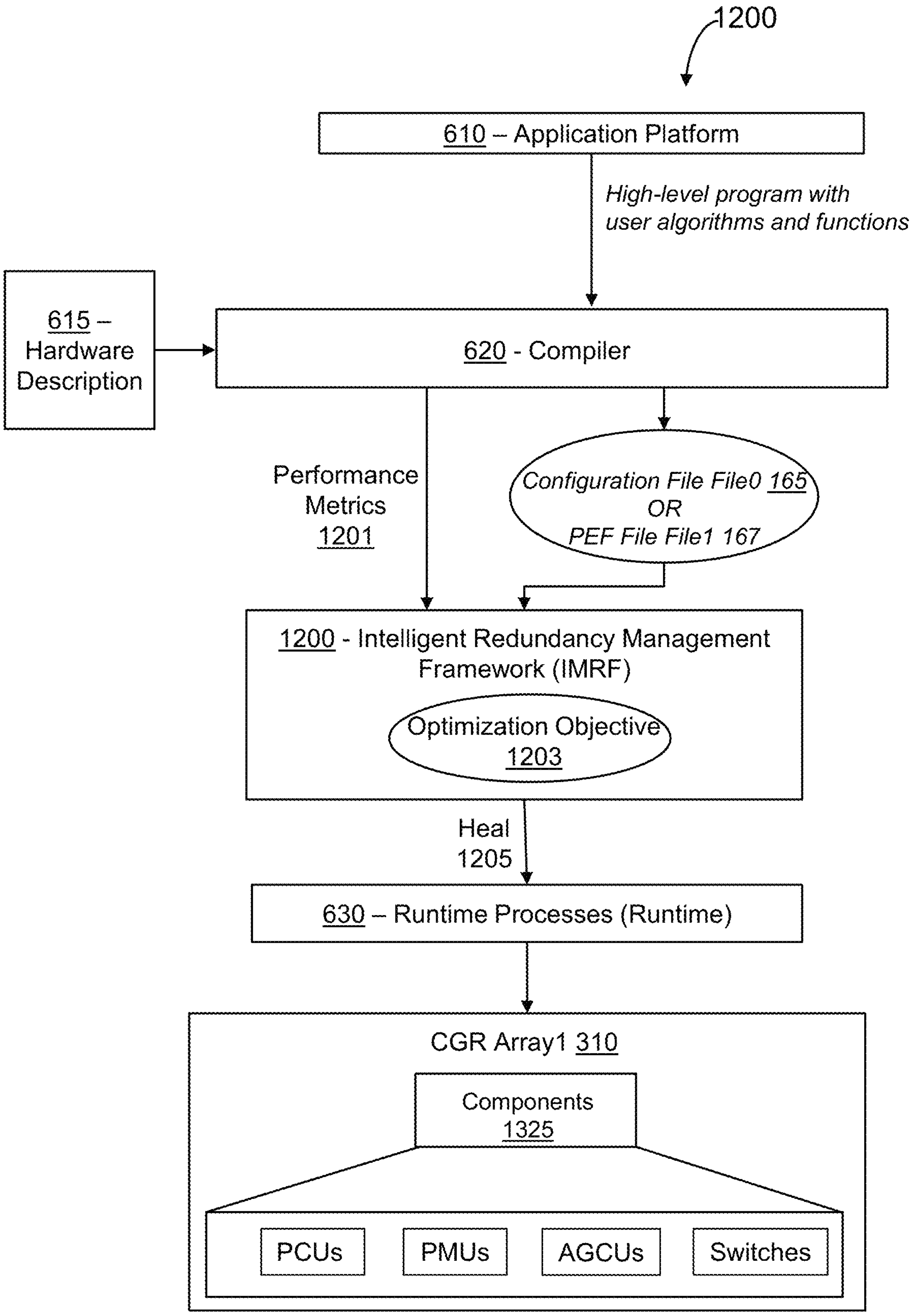
FIG. 13 illustrates an example of target components which can be healed by the IRMF, according to an embodiment of the present disclosure.

FIG. 13 illustrates an example implementation including the IRMF 1200 further illustrating example of components which can be healed by the IRMF 1200, according to an embodiment of the present disclosure. The various configurations (default, alternate) explained with regard to FIGS. 12 to 12C comprise one or more components. Examples of components can include PCUs, PMUs, AGCUs, switches or more, as shown in the FIG. 4, 4A, 5, or 5A. As explained earlier in the specification, in one example, if any of these components, is defective, then configuration is considered defective and the defective configurations are then healed by statically by replacing those with their alternate healthy configurations or dynamically by generating alternate configurations during runtime. In some examples, if during dynamic healing if a component is defective or affected by the defect, then instead of replacing the entire configuration, the defective component can be replaced by another healthy component, retaining the other components in the same configuration.

Figure 13A:
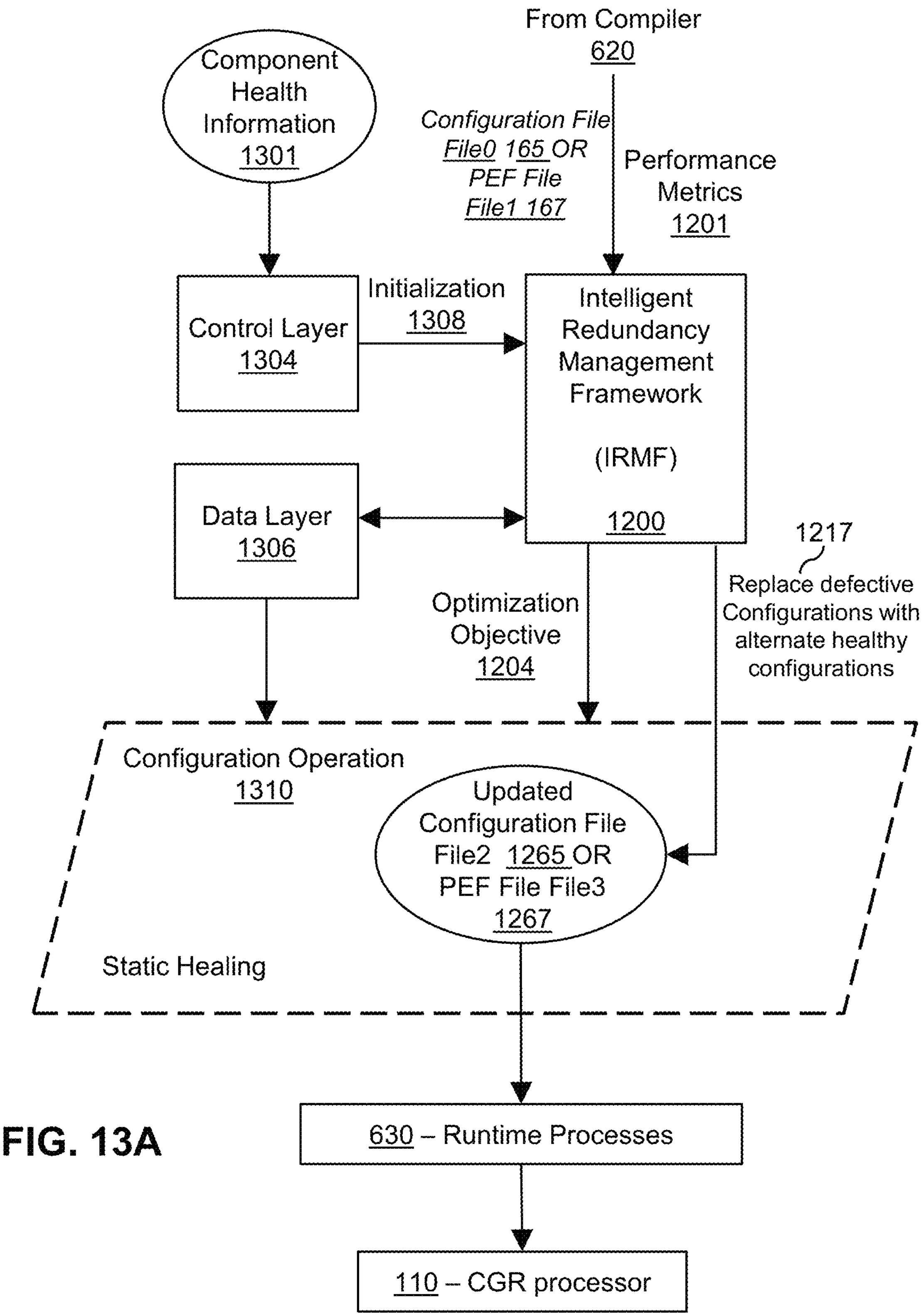
FIG. 13A shows an example implementation of the IRMF for performing a static healing operation, according to an embodiment of the present disclosure.

FIG. 13A shows an example implementation including the IRMF 1200 for performing a static healing operation 1310 with additional blocks control layer 1304 and data layer 1306, according to an embodiment of the present disclosure. As illustrated, in one example the implementation includes the IRMF 1200 coupled to a control layer 1304 and a data layer 1306. The data layer 1306 is coupled to perform a configuration operation 1310 during which a configuration file is used for performing configuration operations of various components. In one example, the control layer 1304 is coupled to receive component health information 1301 from the manufacturer and further provide the same to the IRMF 1200. The IRMF 1200 can be initialized with the component information 1301. The IRMF 1200 can maintain a lookup table of all the components in the CGR processor 110. The data layer 1306 is coupled to interact with the IRMF 1200 and also generate a configuration operation 1310. During the configuration operation 1310, the configuration file file0 165 (shown in FIG. 6) is generated which includes the configurations for various components such as PMUs, PCUs, AGCUs, and more. The data layer 1306 can also provide the configuration file file0 165 to the IRMF 1200. In one example, the IRMF 1200 checks if any of the components being used in the configuration file are defective or affected by any defect, by comparing those against the lookup table. If any defective components are found then, the IRMF 1200 performs a static healing operation during which the defective configurations are replaced by alternate healthy configurations as explained previously with regard to FIGS. 12A and 12B. This may be also referred to as updating the configuration file. As explained with regard to FIG. 6, the configuration file (file0) 165 or the PEF file file1 167 is generated by the compiler 620. After static healing by the IRMF 1200, the updated configuration file file2 1265 or PEF file file3 1267 is provided to the runtime 630 and further to the CGR processor 110. As such, in static healing, the updated configuration file PEF File2 1305 is provided to the runtime before the any components are configured using the configuration information.

Figure 13B:
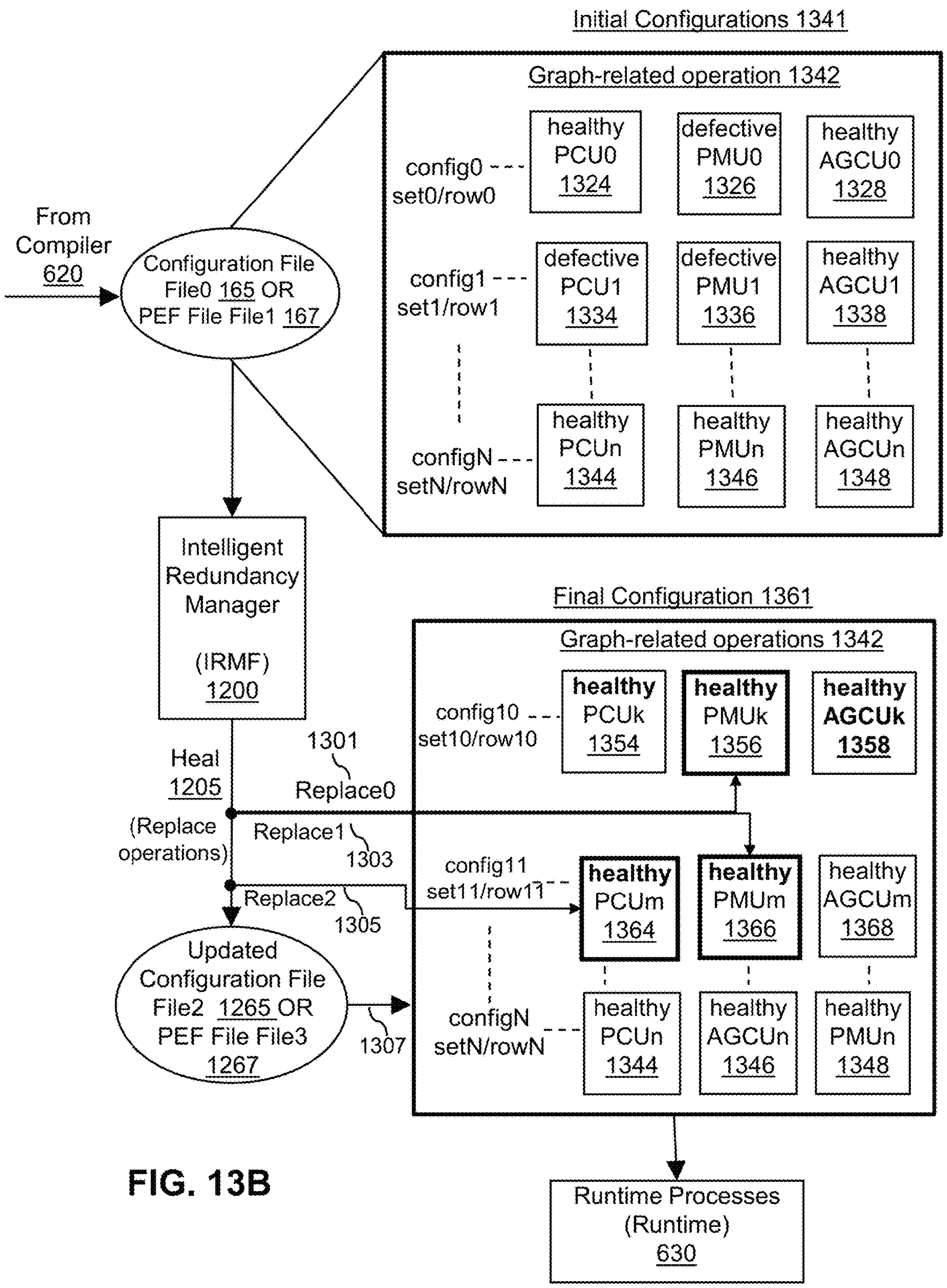
FIG. 13B more details of the example implementation 1300 for performing a static healing operation, according to an embodiment of the present disclosure.

FIG. 13B more details of the example implementation for performing a static healing operation, according to an embodiment of the present disclosure. More specifically, FIG. 13B illustrates an initial configurations 1341 and a final configurations 1361 for a graph-related operation 1342. As explained earlier, the CGR processor 110 shown in FIG. 1 is coupled to perform various datagraphs. During execution of a datagraph, various graph-related operations may be performed. In the example of FIG. 13B, 1342 is one such graph-related operation which further includes various default configurations config0 to configN, each related to a computational task. Furthermore, each default configuration include a plurality of components or a set or row of components. For example, the config0 is for set0/row0 which includes a PCU0 1324, PMU0 1326, and an AGCU0 1328 among many other components, which are not shown here. As indicated, PCU0 1324 is a healthy component, PMU0 1326 is a defective component, and an AGCU0 1328, which is also a healthy component. Similarly, the config1 is for set0/row0, which includes a PCU1 1334 (defective), PMU0 1336 (defective), and an AGCU0 1338 (healthy) among many other components which are not shown here. Furthermore, the configN is for setN/rowN which includes a PCUn 1344 (healthy), PMUn 1346 (healthy), and an AGCUn 1348 (healthy) among many other components which are not shown here. The PMUs, PCUs, and the AGCUs mentioned above can be any of the PMUs, PCUs, and AGCUs shown in the FIG. 4. Also, there can be one-to-one, many-to-one, or one-to-many mapping between the tasks and the components. It may be understood that these default configurations are generated by the compiler 620 via the configuration file (file0) 165. In one example, in static healing, the IRMF 1200 interacts with the configuration file 165 and replaces all defective configurations with alternate configurations including all healthy components and generates an updated configuration file. In other words, in static healing the heal operation 1205 includes replace operations which replace configurations in the configuration file (file0) 165. In this example the replace operations are shown as replace0 1301, replace1 1303, and replace2 1305. The resultant final configurations 1361 illustrate that all the healthy components in the default configuration 1341 are retained and the defective configuration config0 is now replaced by an alternate config10 assigned to set10/row10 made up of all similar healthy components PCUk 1354, PMUk 1356, and AGCUk 1358. Similarly, the config1 which includes a PCU1 1334 (defective), PMU0 1336 (defective) is considered defective and therefore is replaced by another alternate config11 assigned to set11/row11, which includes similar healthy components PCUm 1364, PMUm 1366, AGCUm 1368. The alternate configurations config0 and config1 are received from the updated configuration file file2 1265 as shown. More details about this are explained with regard to FIGS. 12 to 12C. Since the default configN assigned to setN/rowN includes all healthy components, this configuration is retained. All the configurations are further provided to the runtime 630.

Figure 14A:
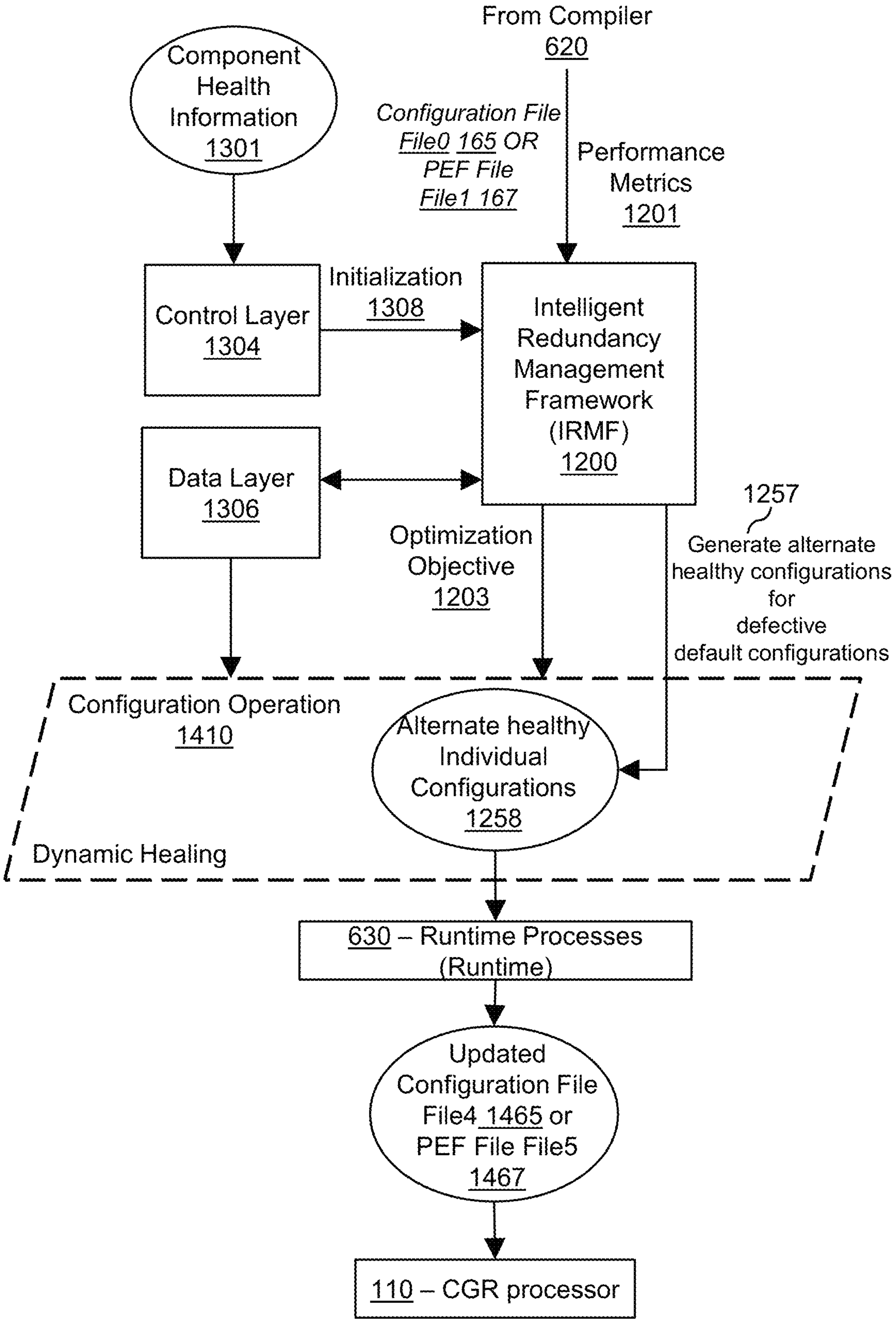
FIG. 14A shows an example implementation of the IRMF for performing a dynamic healing operation, according to an embodiment of the present disclosure.

FIG. 14A shows an example implementation 1400 of the IRMF 1200 for performing a dynamic healing operation, according to an embodiment of the present disclosure. FIG. 14A shares many common blocks with FIG. 13A. One difference between static and dynamic healing is that in dynamic healing the IRMF 1200 heals a defective configuration during runtime or replaces a defective component with a healthy component during runtime, i.e., when the components are being configured. As shown, initially the compiler 620 generates the configuration file file0 165 or the PEF File1 167 which is provided to the runtime processes 630. The runtime 630 can then start to configure the components as per the configuration file file0 165. At this time of any of the components is defective then in one example, the IRMF 1200 heals the entire defective configuration by generating an alternate configuration with similar healthy components as shown by 1258. These alternate configurations are provided to the runtime 630, which generates another updated configuration file file4 1465 or PEF file file5 1467.

Figure 14B:
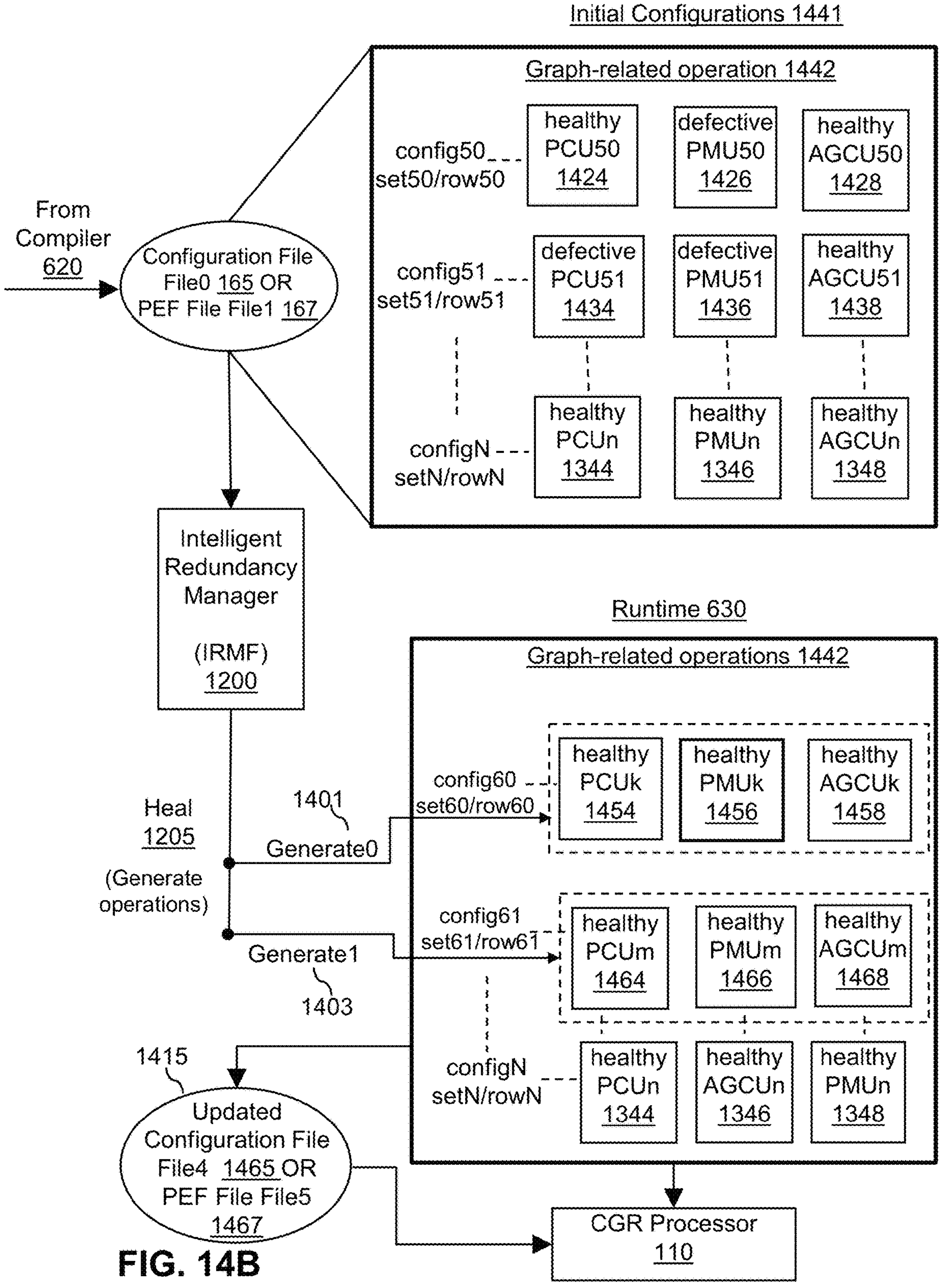
FIG. 14B more details of the example implementation for performing a dynamic healing operation, according to an embodiment of the present disclosure.

FIG. 14B more details of the example implementation 1400 for performing a dynamic healing operation, according to an embodiment of the present disclosure. FIG. 14A shares a few common blocks with FIG. 13B such as the compiler 620, the configuration file, file0 165, and the IRMF 1200. Additionally shown in FIG. 14A is the runtime 630. In this example, the initial configurations 1441 include the config50 for set50/row50 which includes a PCU50 1424, PMU50 1426, and an AGCU50 1428 among many other components, which are not shown here. As indicated, PCU50 1424 is a healthy component, the PMU50 1426 is a defective component, and the AGCU50 1328, which is also a healthy component. Similarly, the config51 is for set51/row51, which includes a PCU51 1434 (defective), PMU51 1436 (defective), and an AGCU51 1438 (healthy) among many other components which are not shown here.

Furthermore, the configN is for setN/rowN which includes a PCUn 1344 (healthy), PMUn 1346 (healthy), and an AGCUn 1348 (healthy) among many other components which are not shown here.

As explained earlier, the default configuration file file0 165 is a result of the configuration file received by the compiler 620. One difference between in FIG. 14A and FIG. 13B is that in FIG. 14A, there in the example of FIG. 14A i.e., (dynamic healing) the configuration file file0 165 is provided to the runtime 630 as is and the IRMF 1200 interacts with the runtime 630 to perform healing of any defective components or configurations. This is explained in more details below.

In one example, in dynamic healing, the IRMF 1200 generates alternate healthy configurations for defective configurations components during runtime 630. Furthermore, the runtime generates an updated configuration file file4 1465 or PEF file file5 1467. In this example, the generate operations are shown as generate0 1401 and generate1 1403. As can be seen the default configuration 1441 is provided to the runtime 630 as is. The runtime 630 then starts configuring the components and during this time the IRMF 1200 interacts with the runtime 630 to generates a similar healthy component/configuration for any defective component/configuration. For example, for the first defective config50, the IRMF 1200 generates a healthy config60 including PMUk 1454, a healthy PMUk 1456, and a healthy AGCUk 1458, via first generate operation generate0 1401. Similarly, for the second defective config51, the IRMF 1200 generates a healthy config61 including a healthy PCUm 1464, a healthy PMUm 1466, and a healthy AGCUk 1468, via a second generate operation generate1 1403. In one example, the IRMF 1200 replaces the defective configurations config50 and config51 with the healthy configurations config60 and config61 respectively.

Since the configN has all the healthy components (healthy PCUn 1354, a healthy PMUn 1356, and a healthy AGCUn 1358) in the default configuration 1441, the runtime 630 retains the configN as it is. Although shown sequentially, the runtime 630 can program any or all the configurations concurrently. Similarly, the IRMF 1200 can also perform any or all replacement operations sequentially or concurrently. Furthermore, the healed configurations (config60 and config61) along with the default healthy configuration (configN) are further provided the updated configuration file4 1465 or PEF file file5 1467, which is further provided to the CGR processor 110.

Figure 14C:
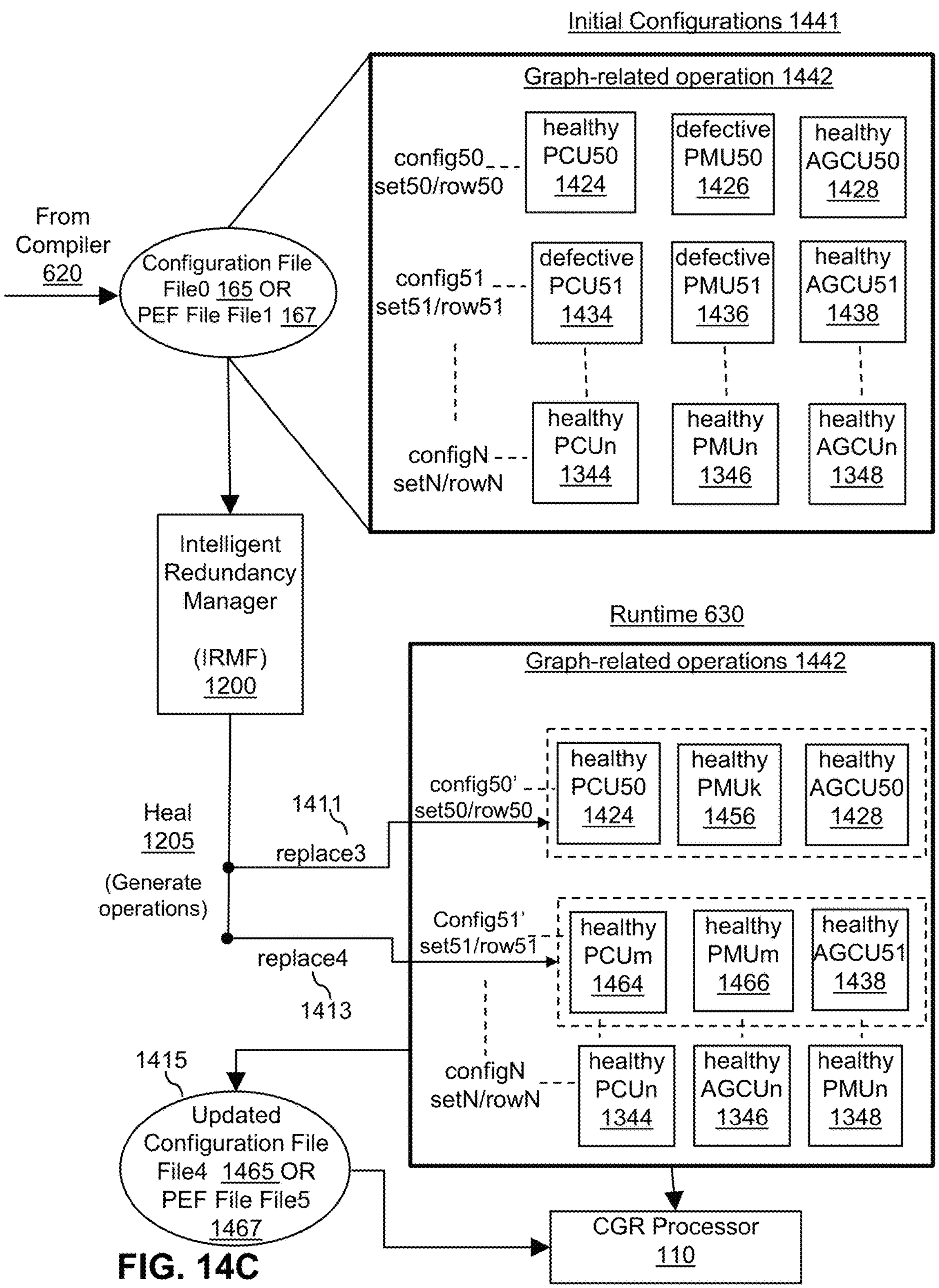
FIG. 14C illustrates another example implementation for performing a dynamic healing operation, according to an embodiment of the present disclosure.

FIG. 14C illustrates another example implementation for performing a dynamic healing operation, according to an embodiment of the present disclosure. FIG. 14C shares many common blocks with FIG. 14B and similarly named blocks mean the same things and are coupled to function in similar ways.

One difference to configure a set of components in the plurality of components using the configuration, between FIG. 14B and FIG. 14C, is that FIG. 14C illustrates the healing of individual components in a defective configuration, instead of generating an entire new or alternate configurations. In other words, a defective configuration as per this example, is altered by replacing one or more defective components. For example, in the initial configuration 1441, the cofig50 is defective because of the defective PMU50 1426. During runtime 630, the config50 is altered to config50' by replacing the defective PMU50 1426 with a healthy PMUk 1456. Similarly, the defective config51 is healed by altering it to config51' by replacing defective PCU51 1434 by the healthy PCUm 1464 and the defective PMU51 1436 by the healthy PMUm 1466. These replacements are shown by replace3 1411 and replace4 1413 respectively.

In some examples, in static healing there can be multiple configuration files stacked together. The IRMF 1200 then chooses the correct one based on the component state (healthy or d Static Healing has multiple configuration files stacked together. IRMF chooses the correct one based on the component state. The default config file is not used if not applicable based on the defect. The default configuration file is used if applicable based on the health of the components. If the components in a tile are defective then an alternate configuration file is selected by the IRMF 1200. In dynamic healing, there is only one configuration file which is the default configuration file and that is updated such that non-defective components are targeted for programming.

Figure 15:
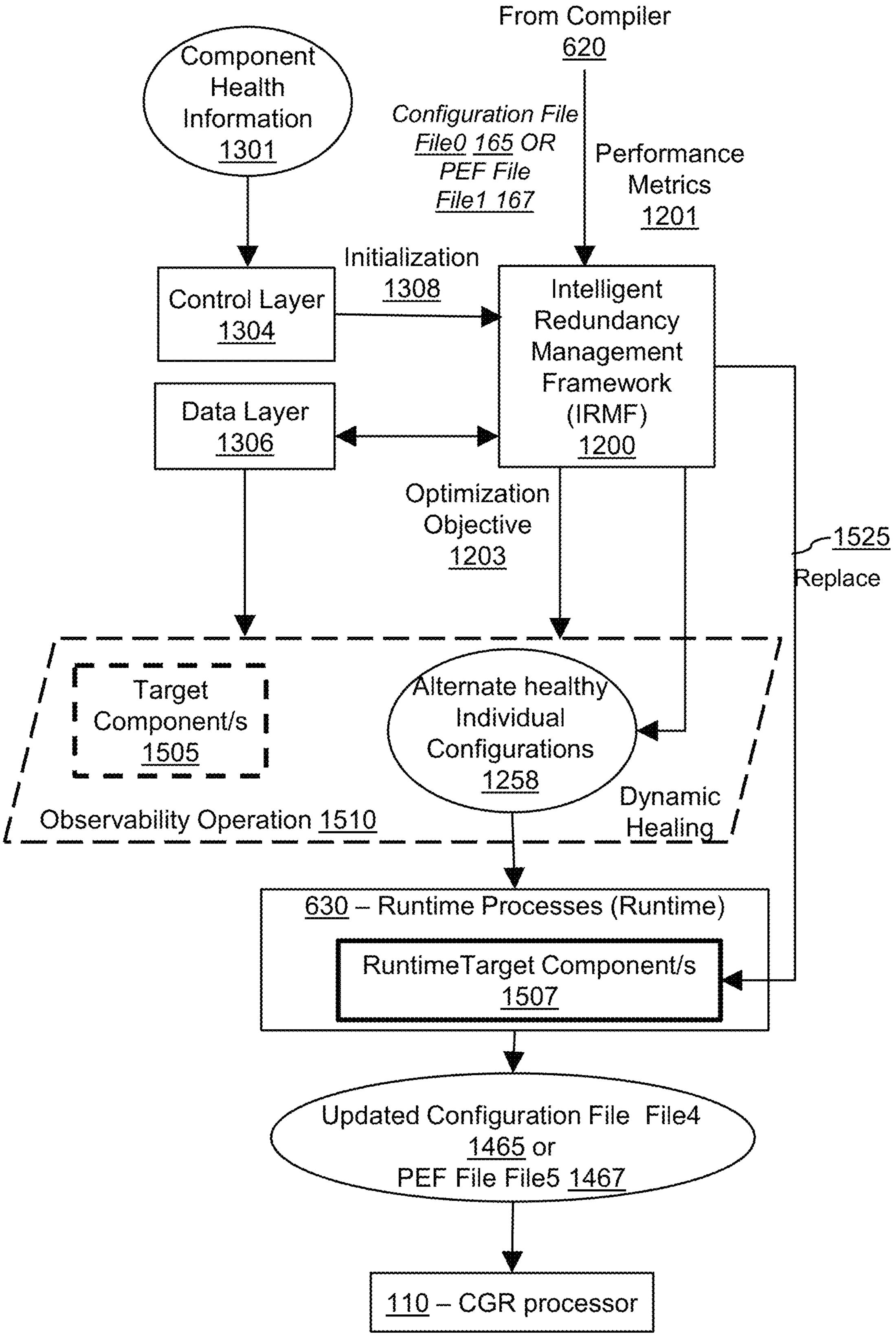
FIG. 15 shows an example implementation of the IRMF for performing an observability operation via a user input, according to an embodiment of the present disclosure.

FIG. 15 shows an example implementation of the IRMF 1200 for performing an observability operation via a user input, according to an embodiment of the present disclosure. As explained earlier in the specification, in one example, the IRMF 1200 can perform an observability operation 1510, which allows a user to inspect the health of components of a specific tile. Illustrated in FIG. 15 are the IRMF 1200, the control layer 1304, and the data layer 1306, the configuration file file0 165, the runtime processes 630, a user input 1501, and one or more target components 1505. In one example, user can specify the one or more target components 1505 via the data layer 1306. The runtime 630 can then generate target components as shown by the runtime target component/s 1507. The IRMF 1200 can then interact with the runtime and check the health of the target component/s. If any of those are found defective then the IRMF 1200 heals those, i.e., replaces those with similar healthy components as shown by 1525. Since the target component/s are generated and healed during the runtime 630, this type of observability operation can occur during dynamic healing. The user can also target all the components of a tile during an observability operation. The IRMF can then heal any defective components to ensure only healthy components are read. The target components can be any of the components mentioned earlier such as PCUs, PMUs, AGCUS, and switches.

It should be noted that in any or all of the above Figures (FIGS. 6, 6A, and 12 to 15) the IRMF 1200, can be part of the runtime 630. In other examples, the IRMF 1200 can be implanted separately as well.

In one example, the goal of static or dynamic healing of components is to optimize the performance of the applications running on the CGR processor 110. In static healing, as the components are healed before being provided to the runtime, latency of the graph-related operations is optimized. On the other hand, in dynamic healing since the components are healed during runtime, the space is optimized. Therefore, in order to decide whether to use static healing or dynamic healing, the IRMF uses performance metrics of the CGR processor 110. If based on the current performance, the CGR processor 110 needs better operation latency, then the IRMF 1200 may use static healing to heal any defective components. If the based on the current performance, the CGR processor 110 needs more memory bandwidth, then the IRMF 1200 may use the dynamic healing. The optimization objective 1204 in FIGS. 12 to 15 is thus decided based on performance metrics. In some examples, the IRMF can also perform hybrid healing to get the most optimized performance.

Figure 16:
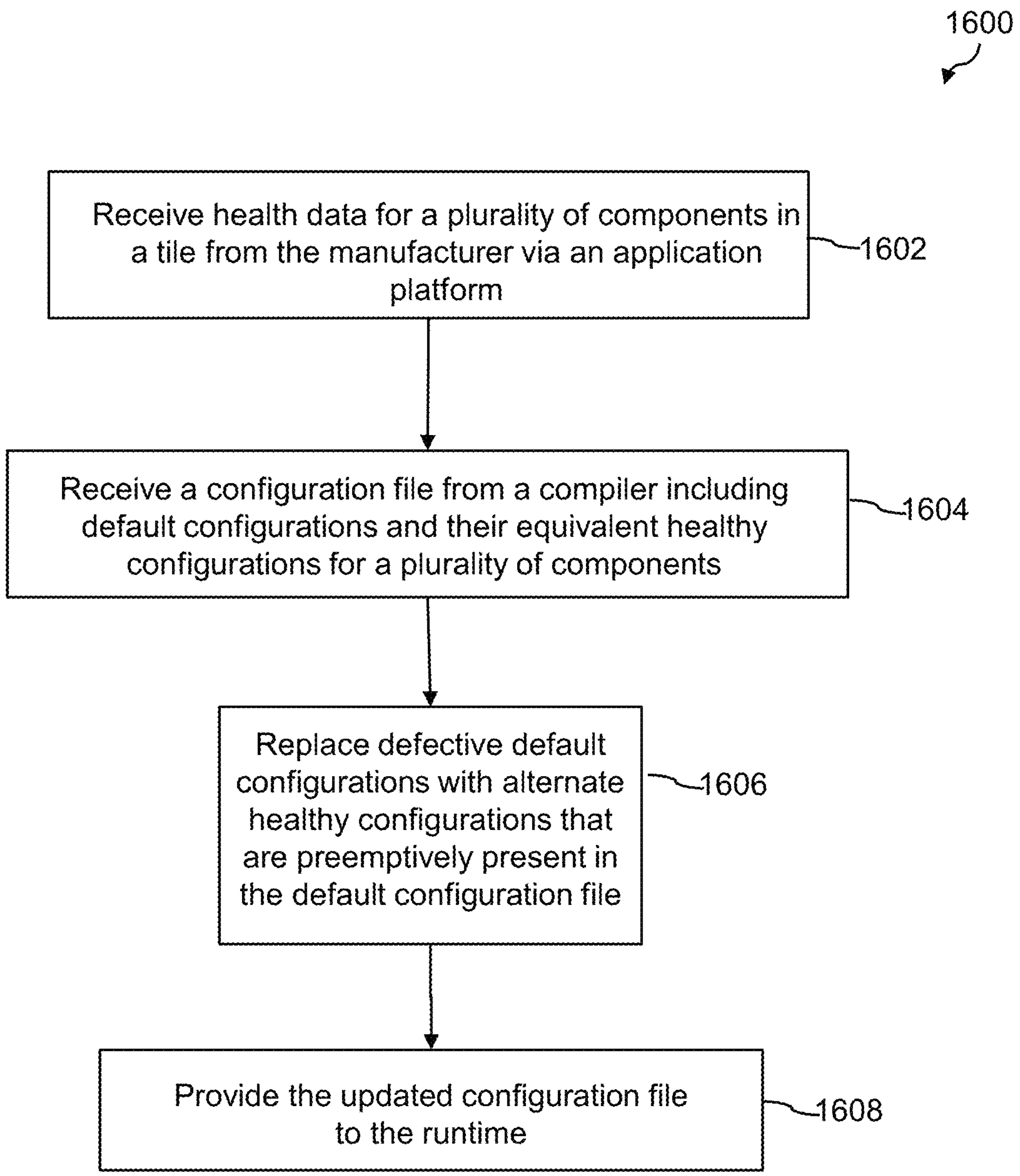
FIG. 16 shows a flow diagram for static healing by the IRMF, according to an embodiment of the present disclosure.

FIG. 16 illustrates an example flow diagram 1600 for the IRMF 1200 to perform static healing, according to an embodiment of the present disclosure. More specifically, the flow diagram 1600 illustrates a method for the IRMF 1200 to identify and heal a defective component in the configuration file.

As shown at step 1602, health data for a component in a tile of the CGR processor can be received from the manufacturer via an application platform. An example of this is shown in FIG. 13A in which component health information 1301 is provided to the control layer 1304. The method can then proceed to step 1604.

At step 1604, configuration file including default configurations and their equivalent healthy configurations for a plurality of components or plurality of sets of components can be received from a compiler. This is shown in FIGS. 13A and 13B as the configuration file file0 165 received from the compiler 620. The method proceeds to step 1606.

At step 1606, defective default configurations can be replaced with alternate healthy configurations that are preemptively present in the default configuration file. An example of this is shown in FIG. 13A and FIG. 13B. In FIG. 13A, defective configurations are replaced with alternate healthy configurations (1217). In FIG. 13B, as shown by the replace operations, replace0 1301, replace1 1303, and replace2 1305, the updated configuration file file2 1265 (or PEF file file3 1267) is coupled to replace the defective configuration config0 with the alternate healthy configuration config10; and the defective configuration config1 with the alternate healthy configuration config11. It may be understood that the alternate healthy configurations are preemptively present in the default configuration file file0 165 or PEF file file1 167. The method then proceeds to step 1608.

At step 1608, the updated configuration file can be provided to the runtime. An example of this is shown in FIG. 13A, which shows the updated configuration file file2 1265 or PEF file file3 1267 is provided to the runtime 630.

Figure 17:
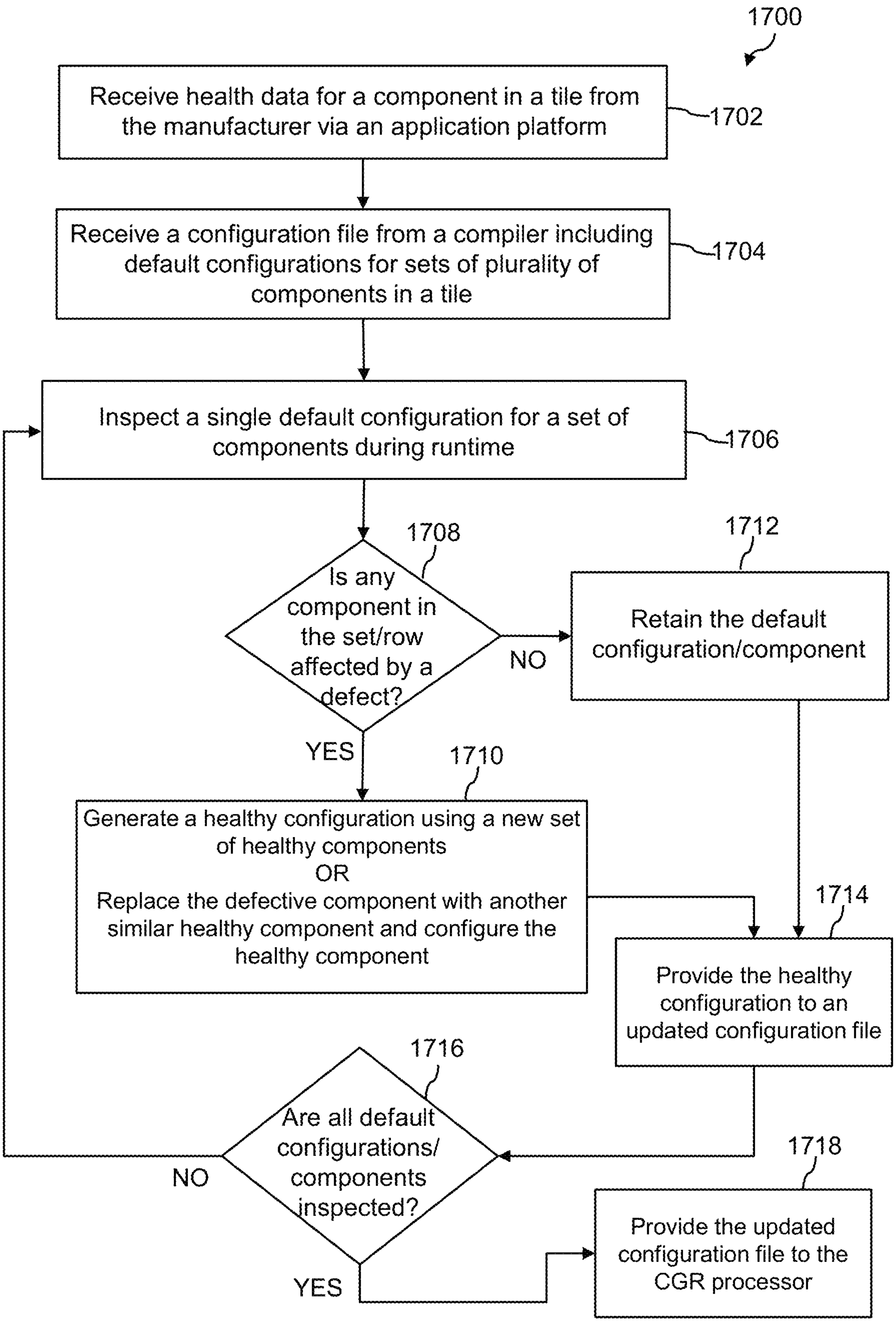
FIG. 17 shows a flow diagram for dynamic healing by the IRMF, according to an embodiment of the present disclosure.

FIG. 17 illustrates an example flow diagram 1700 for the IRMF 1200 to perform dynamic healing, according to an embodiment of the present disclosure. More specifically, the flow diagram 1700 illustrates a method for the IRMF 1200 to identify and heal a defective component or configuration during runtime.

As shown at step 1702, health data for a component in a tile of the CGR processor can be received from the manufacturer via an application platform. An example of this is shown in FIG. 14A in which component health information 1301 is provided to the control layer 1304. The method can then proceed to step 1704.

At step 1704, the IRMF can receive a configuration file from a compiler which includes default configurations. This is shown in FIGS. 14A and 14B as the configuration file file0 165 received from the compiler 620 and the initial configuration 1441 includes defective configurations config50 and config51. The method then proceeds to step 1706.

At steps 1706 and 1708, the IRMF can inspect during runtime, the health of a single default configuration by checking if any component in that configuration is affected by a defect. If so, then the method proceed to step 1710, if not then the method can proceed to step 1712. An example of this is shown in FIGS. 12 to 12C as the inspect logic 1202.

At step 1710, upon identifying that a component is defective, the IRMF can generate an alternate healthy configuration using a set of healthy components. An example of this is shown in FIG. 14B in which the IRMF generates a healthy configuration config10 for the defective configuration config0. In another example, the IRMF can replace the defective component with another similar healthy component. An example of this is shown in FIG. 14C, which shows that in the defective configuration config50, only the defective component PMU50 1426 is replaced by a healthy PMUk 1456. The method can then proceed to step 1714.

At step 1712, upon identifying the configuration/healthy, the default configuration or component can be retained. An example of this is shown in FIG. 14B and FIG. 14C. FIG. 14B shows that the default healthy configuration configN is retained. FIG. 14C shows that the configuration healthy PCU50 1424 which is included in the default configuration config50, is retained in the configuration reconfig50' as well. The method can then proceed to step 1714.

At step 1714, the healthy configurations can be provided to an updated configuration file. An example of this is shown in FIGS. 14B and 14C; where the healthy configurations are provided to the updated configuration file file4 1465 or PEF file file5 1467 as shown by 1415. The method can then proceed to step 1716.

At step 1716, the method can if all the components/configurations are inspected. If so, then the method can proceed to block 1718. If not, then the method go back to the step 1706.

At step 1718, the updated configuration file can be provided to the CGR processor. An example of this is shown in FIGS. 14B and 14C, which show the updated configuration file file4 1465 or PEF file file5 1467 being provided to the CGR processor.

A first example of accelerated deep learning is using a deep learning accelerator implemented in a CGRA to train a neural network. A second example of accelerated deep learning is using the deep learning accelerator to operate a trained neural network to perform inferences. A third example of accelerated deep learning is using the deep learning accelerator to train a neural network and subsequently perform inference with any one or more of the trained neural network, information from the trained neural network, and a variant of the same.

Examples of various implementations are described in the following paragraphs:

Example 1. A data processing system comprising a coarse-grained reconfigurable (CGR) processor including an array of reconfigurable units configured to execute a dataflow graph, a compiler coupled to provide a configuration file including a configuration for a plurality of components in the plurality of reconfigurable units, an initialization block (control plane) coupled to receive health data of a plurality of components in the reconfigurable units and initialize an intelligent redundancy management framework (IRMF) with the health data of the plurality of components, a configuration block (data plane) coupled to configure a set of components in the plurality of components using the configuration, a runtime coupled to execute a plurality of operations using the set of components, wherein the IRMF is coupled to check health data of the set of components and identify the configuration as a defective configuration if a component in the set of component is defective, identify the configuration as a healthy configuration if all the components in the set of components are healthy, and wherein the IRMF is further coupled to perform a healing operation for the defective configuration by replacing the defective configuration with an alternate configuration using a different set of all healthy components.

Example 2. The system of example 1, wherein the healing operation can be a static healing operation or a dynamic healing operation.

Example 3. The system of example 2, wherein in the static healing operation, the configuration file includes a default configuration with healthy or defective components, and an alternate configuration similar to the default configuration, the alternate configuration including healthy components.

Example 4. The system of example 2, wherein in the static healing operation, the IRMF is coupled to receive the configuration file from the compiler and update the configuration file by performing the healing operation before the runtime executing an operation.

Example 5. The system of example 2, wherein in a dynamic healing operation, the IRMF performs the healing operation during runtime.

Example 6. The system of example 1, wherein the component is a pattern compute unit (PCU), pattern memory unit, address generation and coalescing unit, or a switch.

Example 7. The system of example 1, wherein the configuration block is coupled to perform an observability operation on a target component in response to a user input.

Example 8. The system of example 7, wherein the target component is preselected by the user.

Example 9. A method for a data processing system comprising a coarse-grained reconfigurable (CGR) processor including an array of reconfigurable units configured to execute a dataflow graph, receiving by a compiler, a configuration file including a configuration for a plurality of components in the plurality of reconfigurable units, receiving health data of a plurality of components, initializing an intelligent redundancy management framework (IRMF) with the health data of the plurality of components, configuring a set of components in the plurality of components using the configuration, checking health data of the set of components to identify each component as a defective component or a healthy component, retaining the configuration if all the components in the configuration are healthy, replacing the configuration with an alternate configuration by using a different set of all healthy components if a component in the set of components is defective, thereby updating the configuration file, and configuring during runtime, the set of components using the alternate configuration.

Example 10. The method of example 9, further comprising performing a static healing operation or a dynamic healing operation.

Example 11. The method of example 10, further comprising performing the static healing operation by receiving the configuration file including a default configuration with healthy or defective components, and an alternate configuration similar to the default configuration, the alternate configuration including healthy components.

Example 12. The method of example 10, further comprising performing the dynamic healing operation, by receiving configuration file from the runtime and updating the configuration file during the runtime.

Example 13. The method of example 10, wherein the component is a pattern compute unit (PCU), pattern memory unit, address generation and coalescing unit, or a switch.

Example 14. The method of example 9, further comprising an observability operation on a target component in response to a user input.

Example 15. The method of example 14, further comprising selecting via the user input the target component, checking the health data of the target component, and performing a healing operation for the target component upon identifying the target component to be defective during execution.

Example 16. A non-transitory machine-readable medium comprising computer instructions that, in response to being executed by a processor, cause the processor to: produce a configuration file to configure an array of reconfigurable units to execute a dataflow graph, the configuration file comprising a configuration for a plurality of components in the array of reconfigurable units, initialize an intelligent redundancy management framework (IRMF) to receive health data of the plurality of components, configure a set of components in the plurality of components using the configuration, check health data of the set of components to identify each component as a defective component or a healthy component, retain the configuration if all the components in the set of components are healthy, replace the defective configuration with an alternate configuration using a different set of all healthy components, and perform a healing operation for the defective component by replacing the defective configuration with the alternate configuration, thereby updating the configuration file, and configuring during runtime, the set of components using the alternate configuration.

Example 17. The non-transitory machine-readable medium of example 16, wherein the healing operation is a static healing operation or a dynamic healing operation.

Example 18. The non-transitory machine-readable medium of example 17, wherein the IRMF is coupled to perform the static healing operation by receiving the configuration file including a default configuration with healthy or defective components, and an alternate configuration similar to the default configuration, the alternate configuration including healthy components.

Example 19. The non-transitory machine-readable medium of example 18, wherein the IRMF is further coupled to perform the dynamic healing operation, by generating a new configuration using a different set of healthy components during the runtime.

Example 20. The non-transitory machine-readable medium of example 16, wherein the component is a pattern compute unit (PCU), pattern memory unit, address generation and coalescing unit, or a switch.

Examples of neural networks include fully connected neural networks (FCNNs), recurrent neural networks (RNNs), graph neural networks (GNNs), convolutional neural networks (CNNs), graph convolutional networks (GCNs), long short-term memory (LSTM) networks, autoencoders, deep belief networks, and generative adversarial networks (GANs).

An example of training a neural network is determining one or more weights associated with the neural network, such as by back-propagation in a deep learning accelerator. An example of making an inference is using a trained neural network to compute results by processing input data using the weights associated with the trained neural network. As used herein, the term 'weight' is an example of a 'parameter' as used in various forms of neural network processing. For example, some neural network learning is directed to determining parameters (e.g., through back-propagation) that are usable for performing neural network inferences.

A neural network processes data according to a dataflow graph comprising layers of neurons. Example layers of neurons include input layers, hidden layers, and output layers. Stimuli (e.g., input data) are received by an input layer of neurons and the computed results of the dataflow graph (e.g., output data) are provided by an output layer of neurons. Example hidden layers include rectified linear unit (ReLU) layers, fully connected layers, recurrent layers, graphical network layers, long short-term memory layers, convolutional layers, kernel layers, dropout layers, and pooling layers. A neural network may be conditionally and/or selectively trained. After being trained, a neural network may be conditionally and/or selectively used for inference.

Examples of ICs, or parts of ICs, which may be used as deep learning accelerators, are processors such as central processing unit (CPUs), CGR processor ICs, graphics processing units (GPUs), FPGAs, ASICs, application-specific instruction-set processor (ASIP), and digital signal processors (DSPs). The disclosed technology implements efficient distributed computing by allowing an array of accelerators (e.g., reconfigurable processors) attached to separate hosts to directly communicate with each other via buffers.

In one embodiment, each of the AGCUs may be allocated a specific bandwidth to access TLN. This is similar to VAGs participating and winning arbitration to get access to the TLN. For example, the RDU 110 may include one or more AGCU arbiters to arbitrate among the AGCUs 202 to 232 to gain access to the TLN agents 244 to 266. The arbiter may be implemented in hardware or software or both.

In one example, a software implemented arbiter may keep a table of AGCUs and their need to access the external memory devices or host. Those AGCUs which have a higher bandwidth demand to access the external memory devices or host, may be assigned a higher priority than those which have a lower need. The higher priority AGCUs may be selected to access TLN. In other words, the higher priority AGCUs may get more bandwidth on the TLN than the lower priority ones.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the implementations described herein.

Although the description has been described with respect to particular implementations thereof, these particular implementations are merely illustrative, and not restrictive. The description may reference specific structural implementations and methods and does not intend to limit the technology to the specifically disclosed implementations and methods. The technology may be practiced using other features, elements, methods and implementations. Implementations are described to illustrate the present technology, not to limit its scope, which is defined by the claims. Those of ordinary skill in the art recognize a variety of equivalent variations in the description above.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to particular implementations thereof, these particular implementations are merely illustrative, and not restrictive. For instance, many of the operations can be implemented in a CGRA system, a System-on-Chip (SoC), application-specific integrated circuit (ASIC), programmable processor, in a programmable logic device such as a field-programmable gate array (FPGA) or a graphics processing unit (GPU), obviating a need for at least part of the dedicated hardware. Implementations may be as a single chip, or as a multi-chip module (MCM) packaging multiple semiconductor dies in a single package. All such variations and modifications are to be considered within the ambit of the present disclosed technology, the nature of which is to be determined from the foregoing description.

One or more implementations of the technology or elements thereof can be implemented in the form of a computer product, including a non-transitory computer-readable storage medium with computer usable program code for performing any indicated method steps and/or any configuration file for one or more RDUs to execute a high-level program. Furthermore, one or more implementations of the technology or elements thereof can be implemented in the form of an apparatus including a memory and at least one processor that is coupled to the memory and operative to perform exemplary method steps, and/or an RDU that is operative to execute a high-level program based on a configuration file. Yet further, in another aspect, one or more implementations of the technology or elements thereof can be implemented in the form of means for carrying out one or more of the method steps described herein and/or executing a high-level program described herein. Such means can include (i) hardware module(s); (ii) software module(s) executing on one or more hardware processors; (iii) bit files for configuration of a CGR array; or (iv) a combination of aforementioned items.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit of the technology disclosed.

The invention claimed is:

1. A data processing system comprising a coarse-grained reconfigurable (CGR) processor including an array of reconfigurable units configured to execute a dataflow graph, a compiler coupled to provide a configuration file including a configuration for a plurality of components in the array of reconfigurable units, an initialization block (control plane) coupled to receive health data of a plurality of components in the array of reconfigurable units and initialize an intelligent redundancy management framework (IRMF) comprising a self-healing system for configurable data units within the CGR processor with the health data of the plurality of components, a configuration block (data plane) coupled to configure a set of components in the plurality of components using the configuration, a runtime coupled to execute a plurality of operations using the set of components, wherein the IRMF is coupled to check health data of the set of components and identify the configuration as a defective configuration if a component in the set of components is defective, identify the configuration as a healthy configuration if all the components in the set of components are healthy, wherein the IRMF is further coupled to perform a healing operation for the defective configuration by replacing the defective configuration with an alternate configuration using a different set of all healthy components, and wherein the configuration block is further coupled to perform an observability operation on a target component in response to a user input.

2. The system of claim 1, wherein the healing operation can be a static healing operation or a dynamic healing operation.

3. The system of claim 2, wherein in the static healing operation, the configuration file includes a default configuration with healthy or defective components, and an alternate configuration similar to the default configuration, the alternate configuration including healthy components.

4. The system of claim 2, wherein in the static healing operation, the IRMF is coupled to receive the configuration file from the compiler and update the configuration file by performing the healing operation before the runtime executing an operation.

5. The system of claim 2, wherein in a dynamic healing operation, the IRMF performs the healing operation during runtime.

6. The system of claim 1, wherein the component is a pattern compute unit (PCU), pattern memory unit, address generation and coalescing unit, or a switch.

7. The system of claim 1, wherein the target component is preselected by the user.

8. A method for a data processing system comprising a coarse-grained reconfigurable (CGR) processor including an array of reconfigurable units configured to execute a dataflow graph, receiving by a compiler, a configuration file including a configuration for a plurality of components in the array of reconfigurable units, receiving health data of a plurality of components, initializing an intelligent redundancy management framework (IRMF) comprising a self-healing system for configurable data units within the CGR processor with the health data of the plurality of components, configuring a set of components in the plurality of components using the configuration, checking health data of the set of components to identify each component as a defective component or a healthy component, retaining the configuration if all the components in the configuration are healthy, replacing the configuration with an alternate configuration by using a different set of all healthy components if a component in the set of components is defective, thereby updating the configuration file, configuring during runtime, the set of components using the alternate configuration, and performing an observability operation on a target component in response to a user input.

9. The method of claim 8, further comprising performing a static healing operation or a dynamic healing operation.

10. The method of claim 9, further comprising performing the static healing operation by receiving the configuration file including a default configuration with healthy or defective components, and an alternate configuration similar to the default configuration, the alternate configuration including healthy components.

11. The method of claim 9, further comprising performing the dynamic healing operation, by receiving configuration file from the runtime and updating the configuration file during the runtime.

12. The method of claim 9, wherein the component is a pattern compute unit (PCU), pattern memory unit, address generation and coalescing unit, or a switch.

13. The method of claim 8, further comprising selecting via the user input the target component, checking the health data of the target component, and performing a healing operation for the target component upon identifying the target component to be defective during execution.

14. A non-transitory machine-readable medium comprising computer instructions that, in response to being executed by a processor, cause the processor to:

produce a configuration file to configure an array of reconfigurable units to execute a dataflow graph, the configuration file comprising a configuration for a plurality of components in the array of reconfigurable units, initialize an intelligent redundancy management framework (IRMF)) comprising a self-healing system for configurable data units within the array of reconfigurable units to receive health data of the plurality of components, configure a set of components in the plurality of components using the configuration, check health data of the set of components to identify each component as a defective component or a healthy component, retain the configuration if all the components in the set of components are healthy, replace the defective configuration with an alternate configuration using a different set of all healthy components, and perform a healing operation for the defective component by replacing the defective configuration with the alternate configuration, thereby updating the configuration file, configuring during runtime, the set of components using the alternate configuration, and perform an observability operation on a target component in response to a user input.

15. The non-transitory machine-readable medium of claim 14, wherein the healing operation is a static healing operation or a dynamic healing operation.

16. The non-transitory machine-readable medium of claim 15, wherein the IRMF is coupled to perform the static healing operation by receiving the configuration file including a default configuration with healthy or defective components, and an alternate configuration similar to the default configuration, the alternate configuration including healthy components.

17. The non-transitory machine-readable medium of claim 16, wherein the IRMF is further coupled to perform the dynamic healing operation, by generating a new configuration using a different set of healthy components during the runtime.

18. The non-transitory machine-readable medium of claim 14, wherein the component is a pattern compute unit (PCU), pattern memory unit, address generation and coalescing unit, or a switch.

19. The non-transitory machine-readable medium of claim 14, wherein the target component is preselected by the user.

* * * * *